United States Patent
Yu

(10) Patent No.: US 7,006,741 B1
(45) Date of Patent: Feb. 28, 2006

(54) CONTACT-FIELD OPTICAL MICROSCOPE

(76) Inventor: Bi Yu, 1364 Timmins Dr., Ann Arbor, MI (US) 48103

( * ) Notice: Subject to any disclaimer, the term of this patent is extended or adjusted under 35 U.S.C. 154(b) by 36 days.

(21) Appl. No.: 11/086,818

(22) Filed: Mar. 22, 2005

(51) Int. Cl.
*G02B 6/04* (2006.01)

(52) U.S. Cl. ............. 385/121; 385/116; 385/126; 385/127

(58) Field of Classification Search ........... 385/121, 385/116, 126, 127
See application file for complete search history.

(56) References Cited

U.S. PATENT DOCUMENTS

| | | | | |
|---|---|---|---|---|
| 4,581,648 A * | 4/1986 | Ganther | .................... | 348/217.1 |
| 5,045,696 A * | 9/1991 | Hirose | .................... | 250/306 |
| 5,254,854 A * | 10/1993 | Betzig | .................... | 250/234 |
| 5,373,320 A * | 12/1994 | Johnson et al. | .......... | 348/217.1 |
| 6,002,740 A * | 12/1999 | Cerrina et al. | ............... | 378/43 |
| 6,285,018 B1 * | 9/2001 | Aebi et al. | ............... | 250/214.1 |
| 6,345,115 B1 * | 2/2002 | Ramm et al. | ............... | 382/133 |
| 6,399,938 B1 * | 6/2002 | Sugawara et al. | ........ | 250/227.2 |
| 6,403,962 B1 * | 6/2002 | Schmitt et al. | ............ | 250/368 |
| 6,411,451 B1 * | 6/2002 | Fliss et al. | ................... | 359/890 |
| 6,430,254 B1 * | 8/2002 | Wilkins | ........................ | 378/43 |
| 6,560,029 B1 * | 5/2003 | Dobbie et al. | .............. | 359/631 |
| 6,567,594 B1 * | 5/2003 | Kijima | ....................... | 385/120 |
| 6,720,996 B1 * | 4/2004 | Suyama et al. | .......... | 348/216.1 |
| 2004/0062347 A1 * | 4/2004 | Kumakhov | .................. | 378/43 |

* cited by examiner

*Primary Examiner*—Ellen E. Kim

(57) ABSTRACT

A broad-spectrum, high spatial and time resolution contact-field optical microscope comprises a fiber optical taper, a vacuum chamber, a photocathode, a magnetic lens photo-electron image enlarger, a micro-channel plate image intensifier, a phosphor screen and a CCD. Sample is placed directly in contact with a smaller sampling face of the optical taper. Light which is emitted, reflected or transmitted by the sample is launched into each of the fiber core ends on the sampling face and conveyed by the optical fibers to a larger imaging face of the optical taper, thereby presenting an enlarged image at the imaging face. The image is converted into a photoelectron image by photocathode which is deposited on the surface of the imaging face. The photoelectron image is further enlarged by magnetic lenses and intensified by micro-channel plate. The enlarged and enhanced electron image is displayed on phosphor screen and coupled through faceplate to CCD.

17 Claims, 15 Drawing Sheets

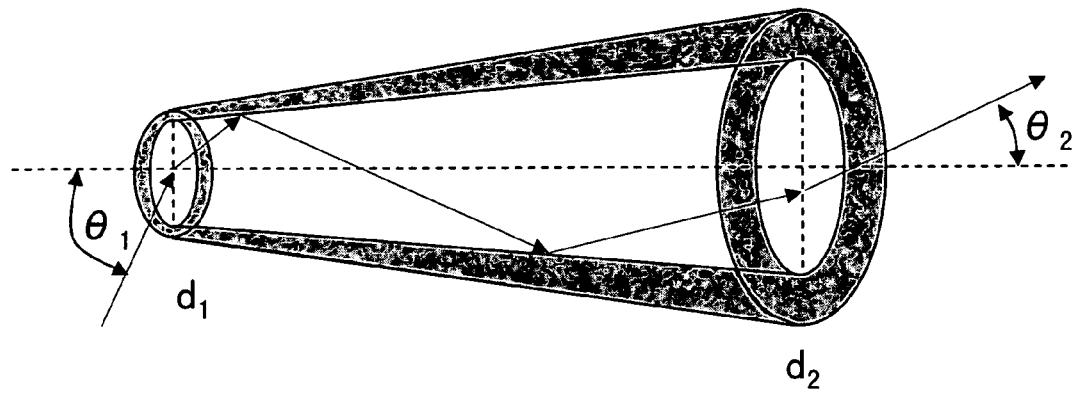
Fig. 1 Tapered optic fiber transmission
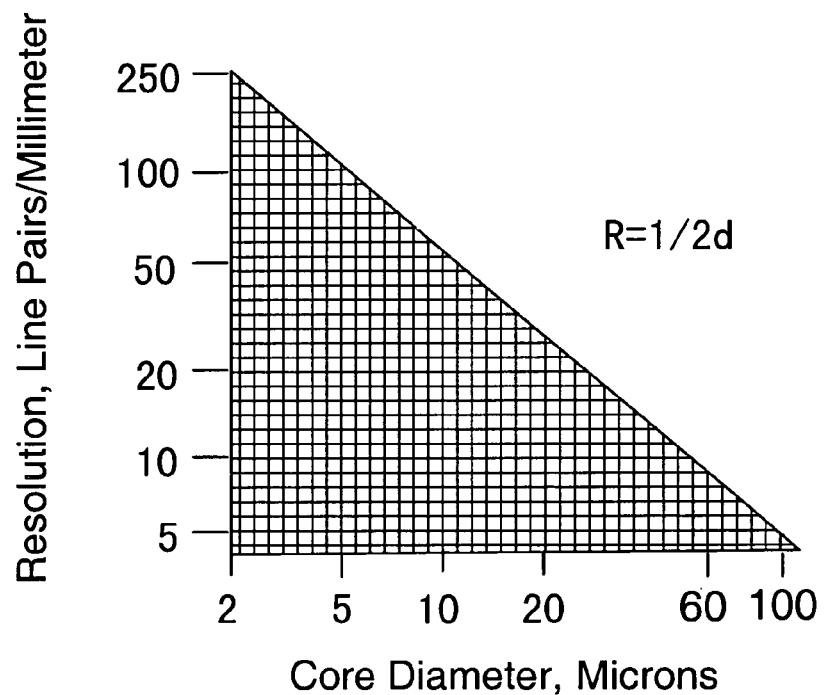
Fig. 2 Fiber optic resolution

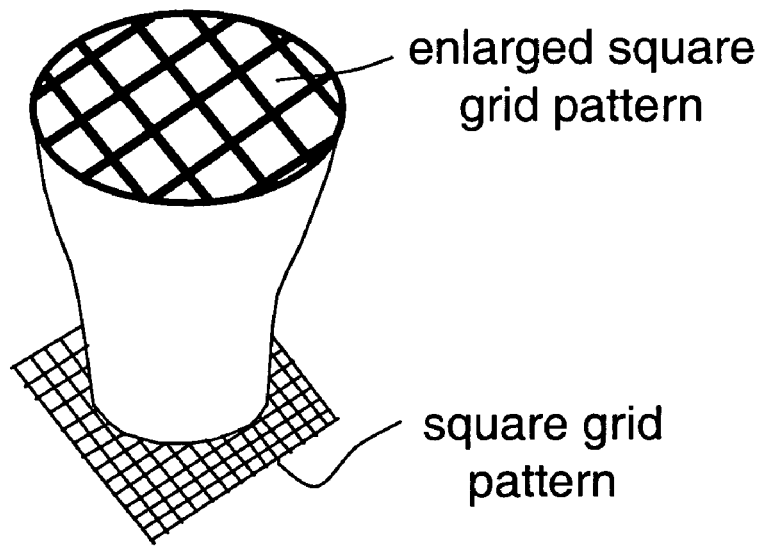
FIG. 3 Fiber optic taper magnifier
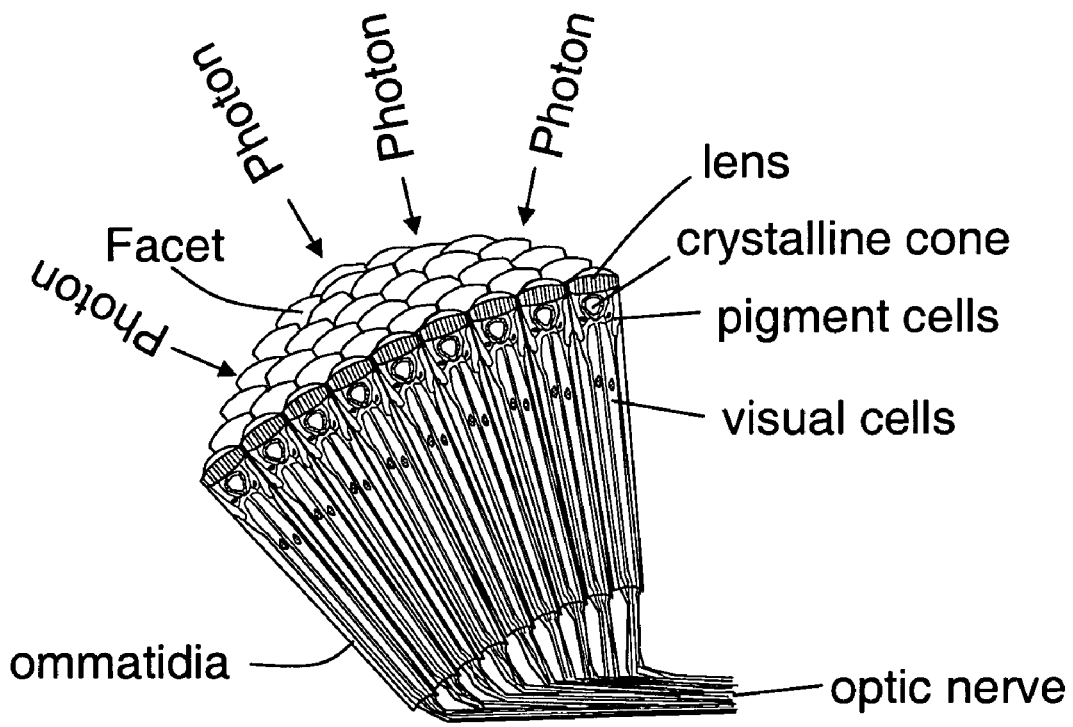
Fig. 4, Compound eye of the insects

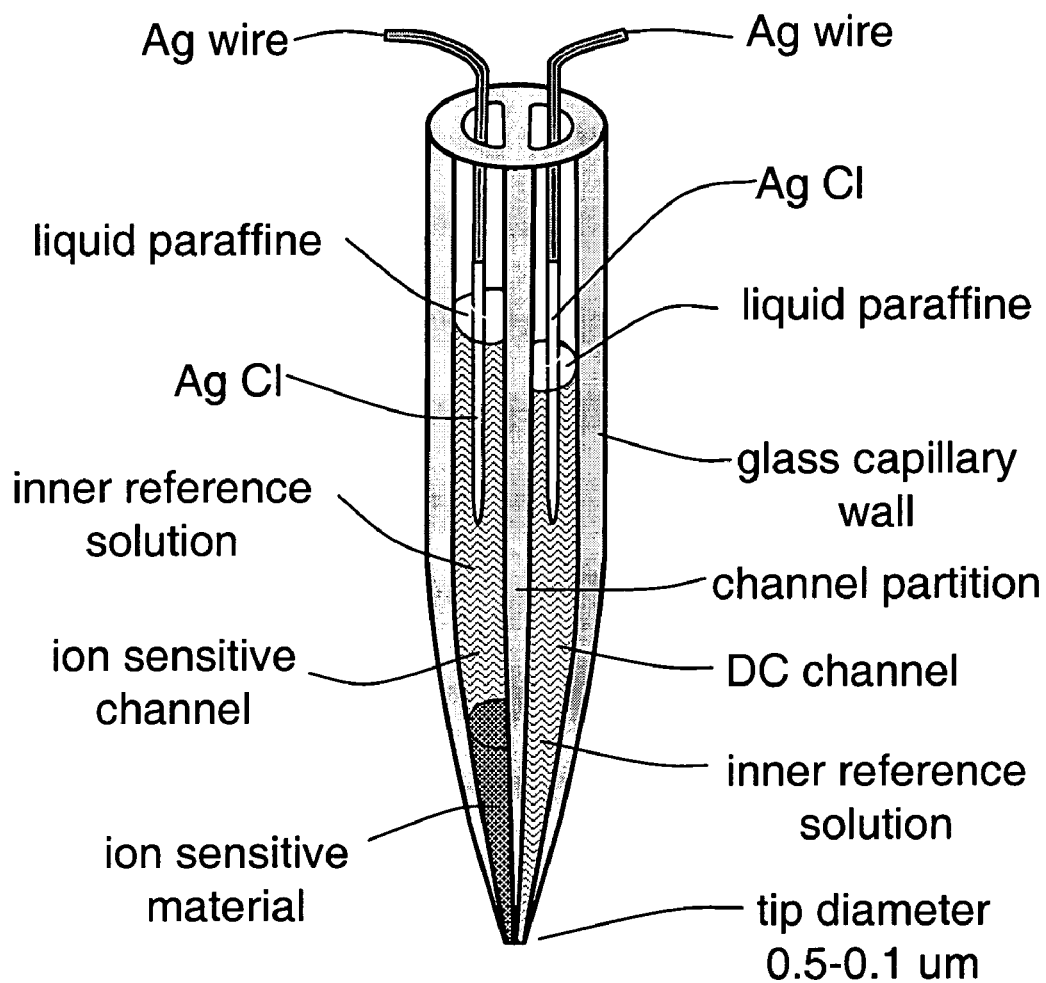
Fig. 5 Structure of two channel ion-sensitive microelectrode

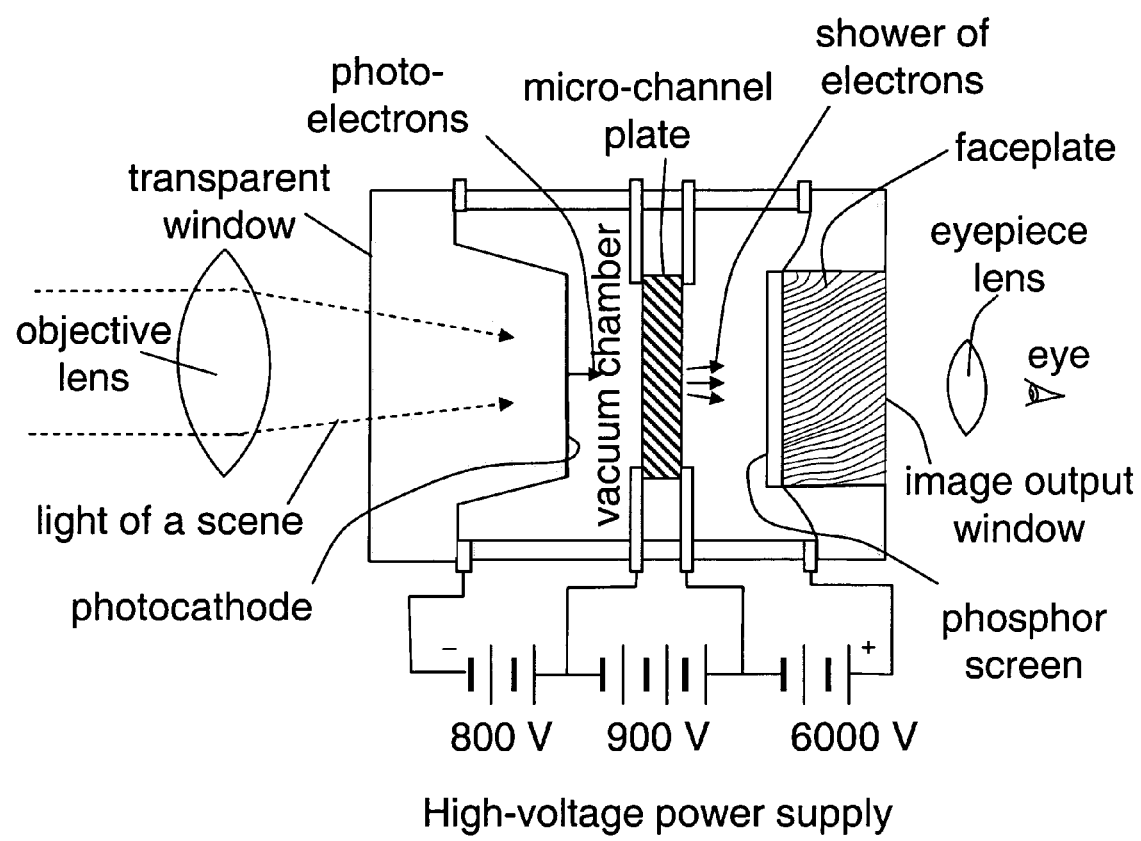
Fig. 6  Structure of night vision device

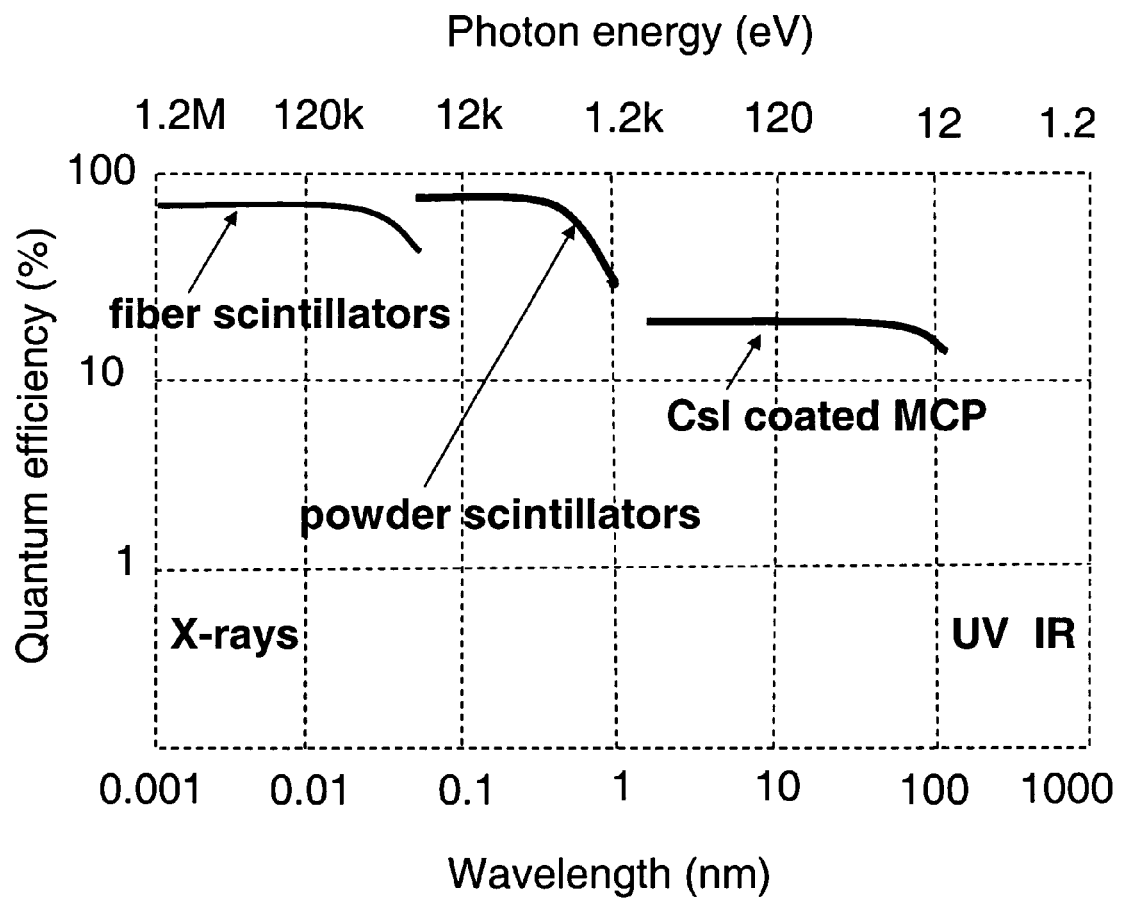
Fig. 7 Photon energy and quantum efficiencies

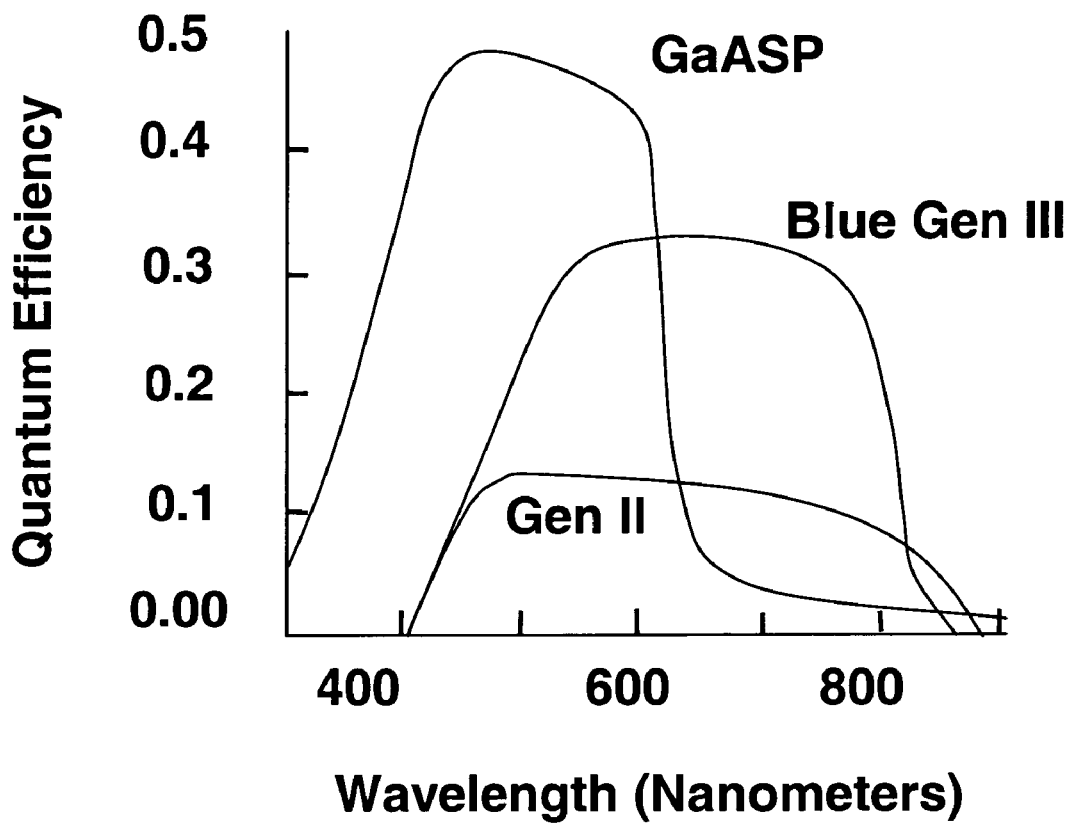
Fig. 8 Photocathode Quantum Efficiencies

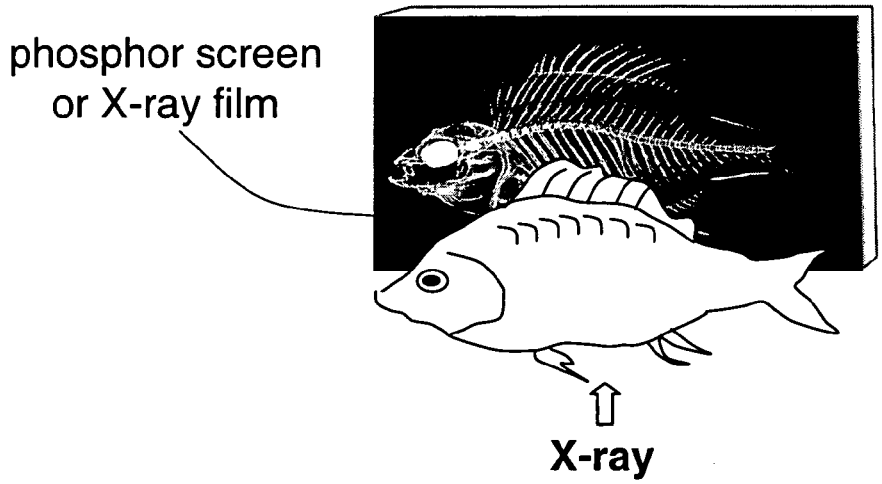
Fig. 9 Projection roentgenoscopy
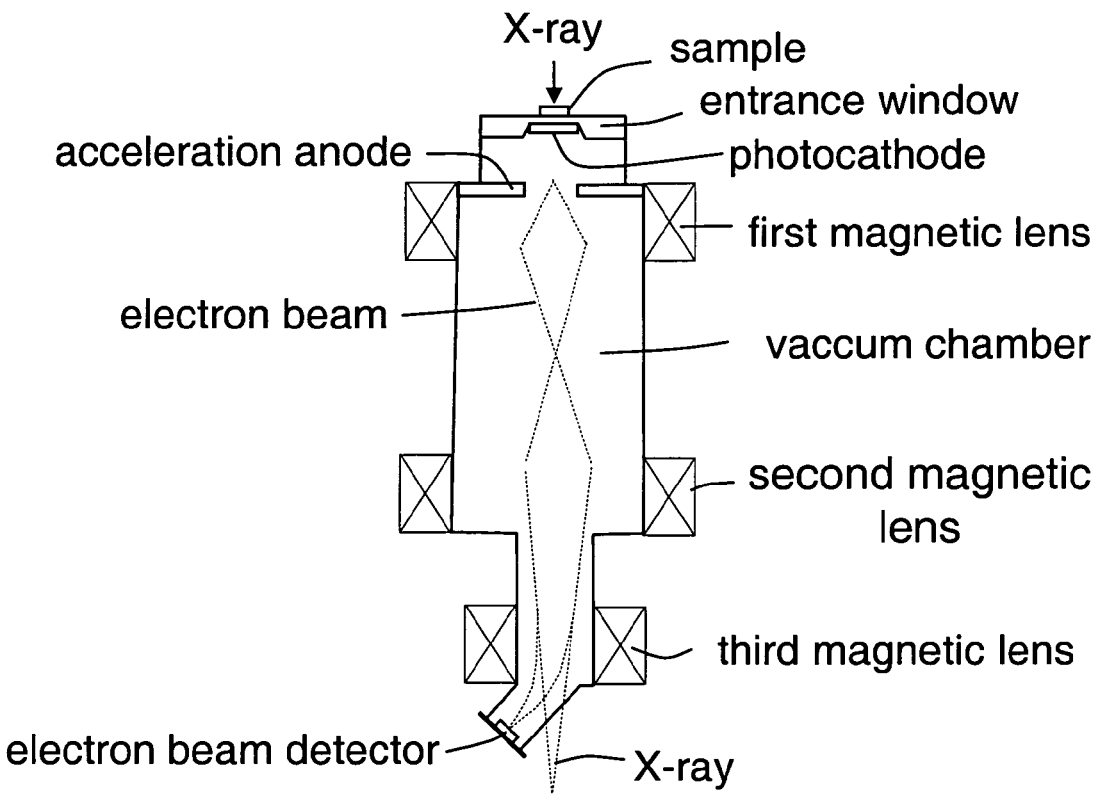
FIG. 10 X-ray microscope apparatus

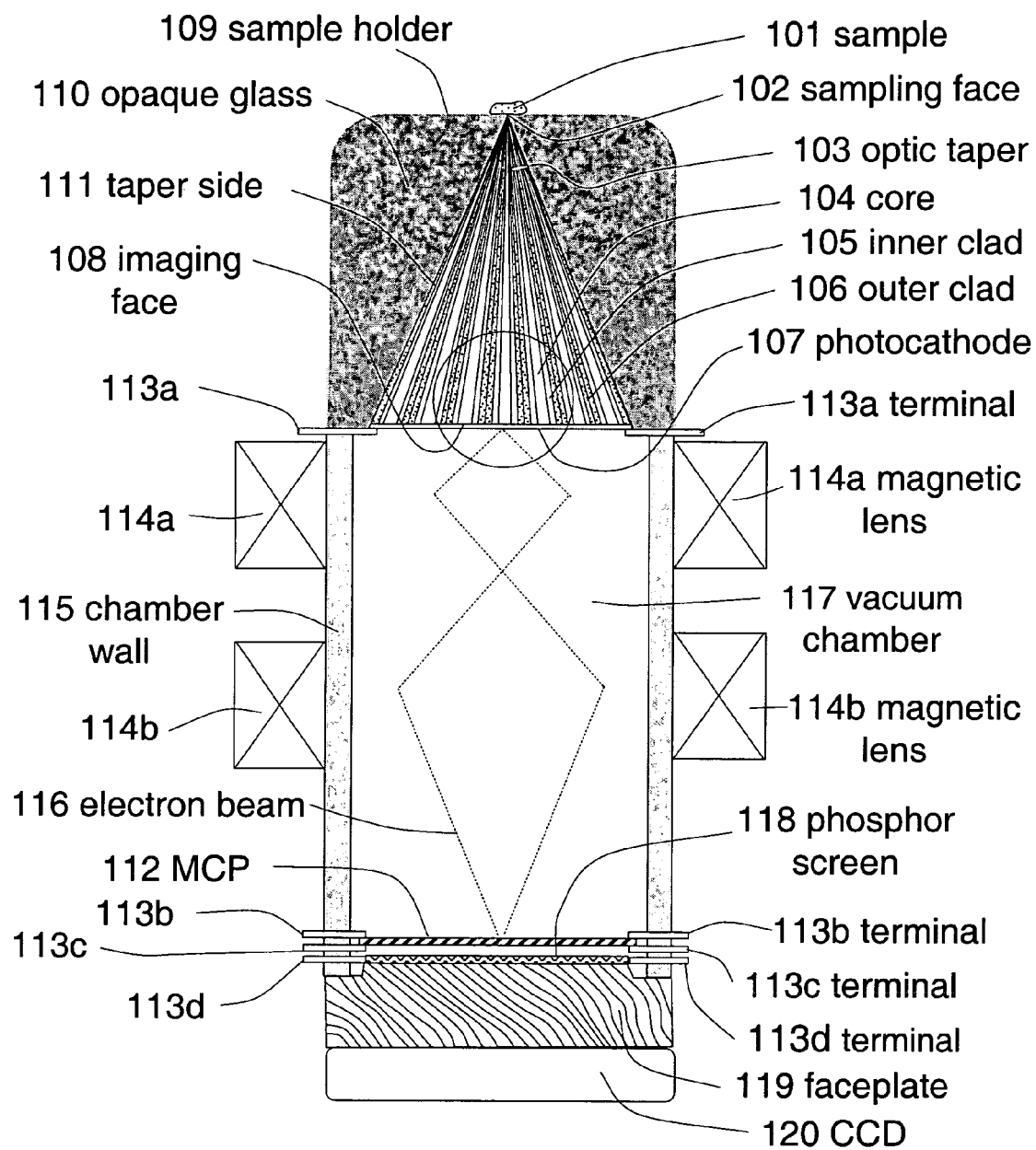
Fig. 11A Visible light contact-field optical microscope

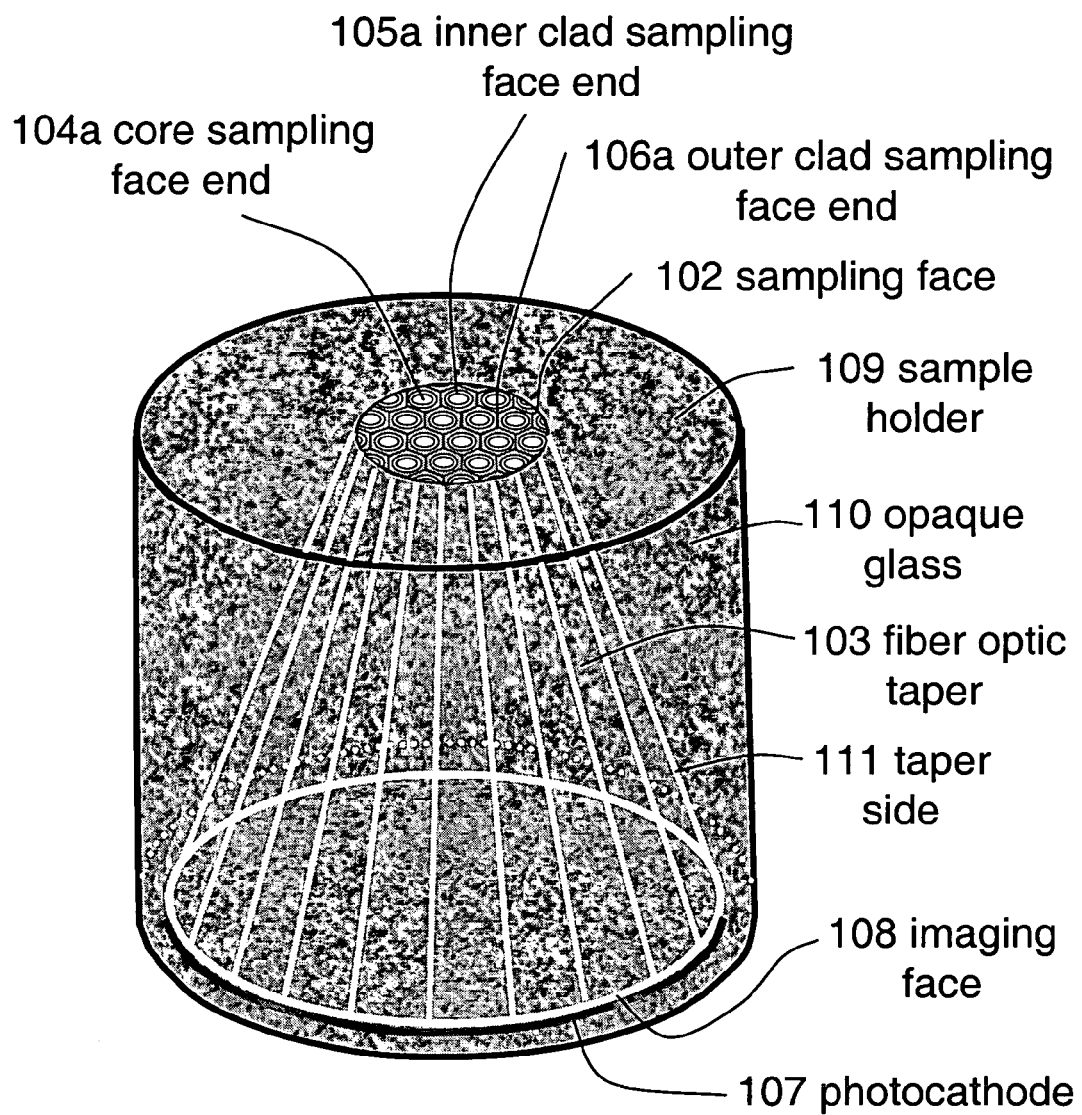
Fig. 11B Enlarged perspective view of the fiber optic taper embedded in the opaque glass

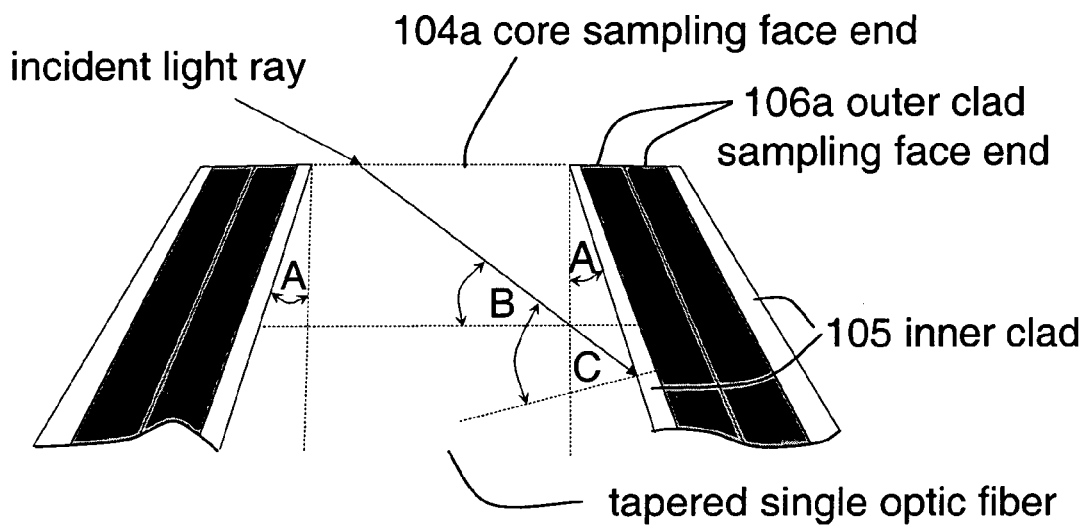
Fig. 11E  Total internal reflection critical angle in single tapered optic fiber
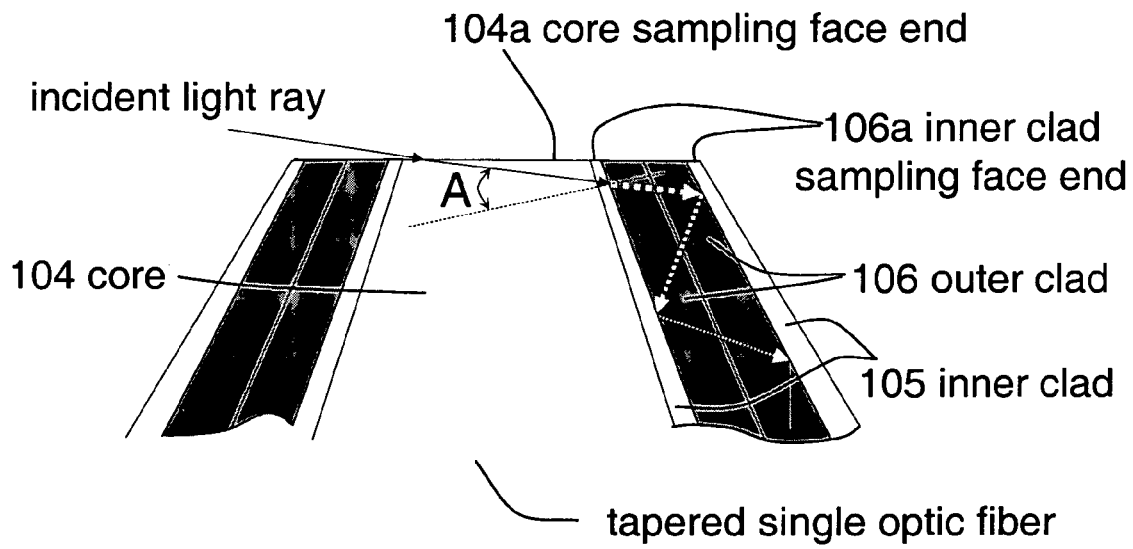
Fig. 11F  Total internal reflection in outer clad of single tapered optic fiber

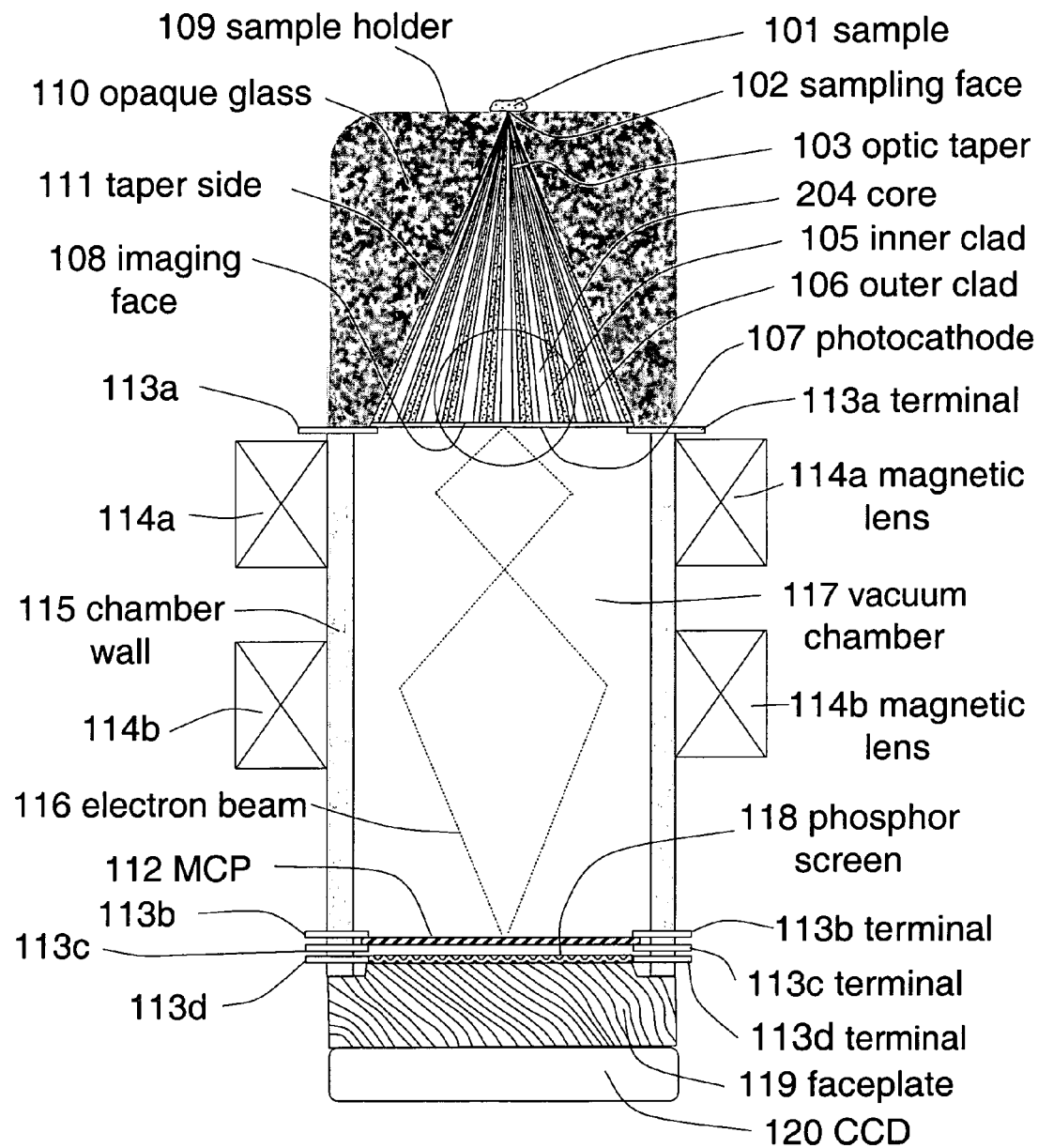
Fig. 12A Infrared contact-field optical microscope

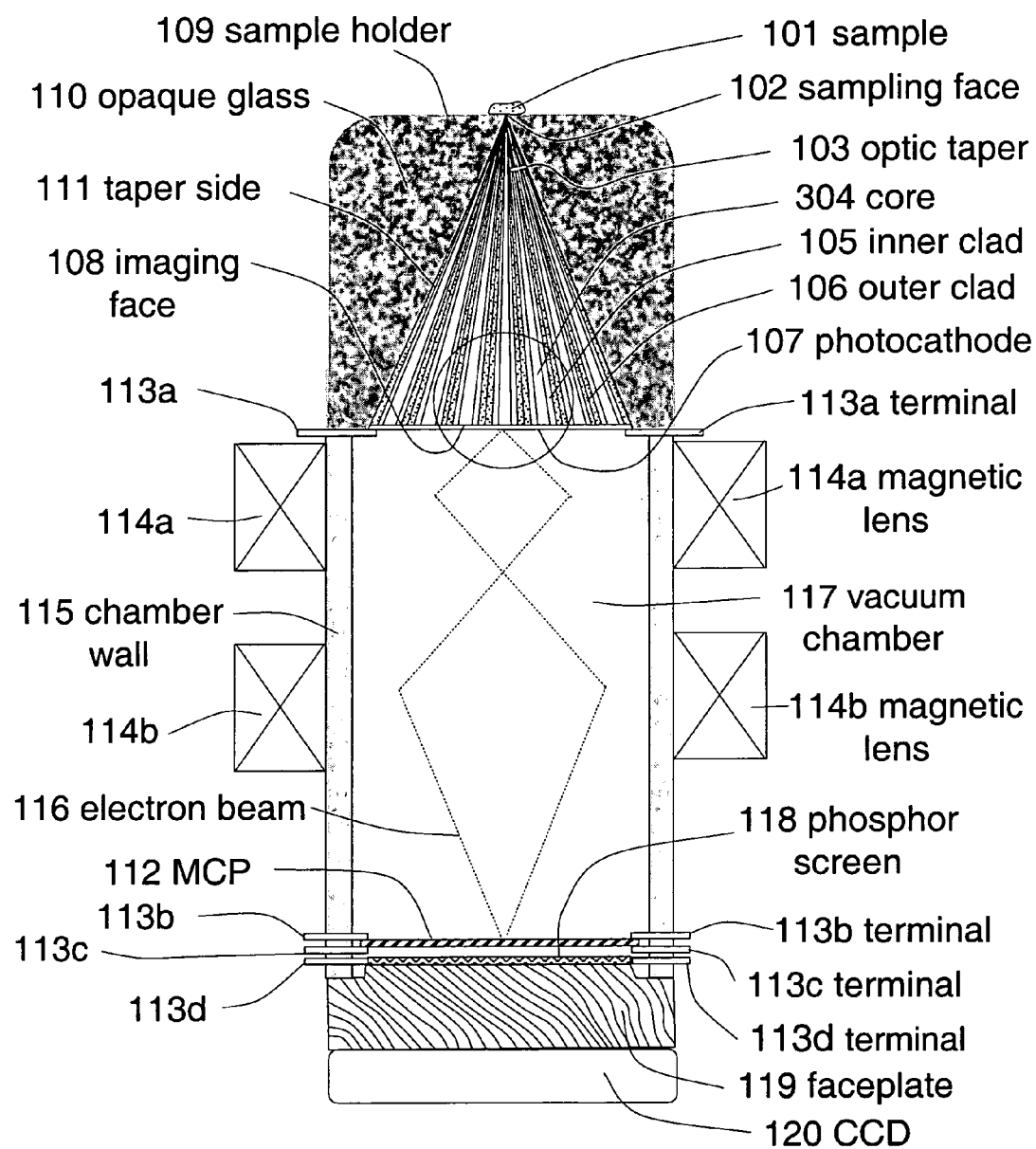
Fig. 13A X-ray, UV, charged particle contact-field optical microscope

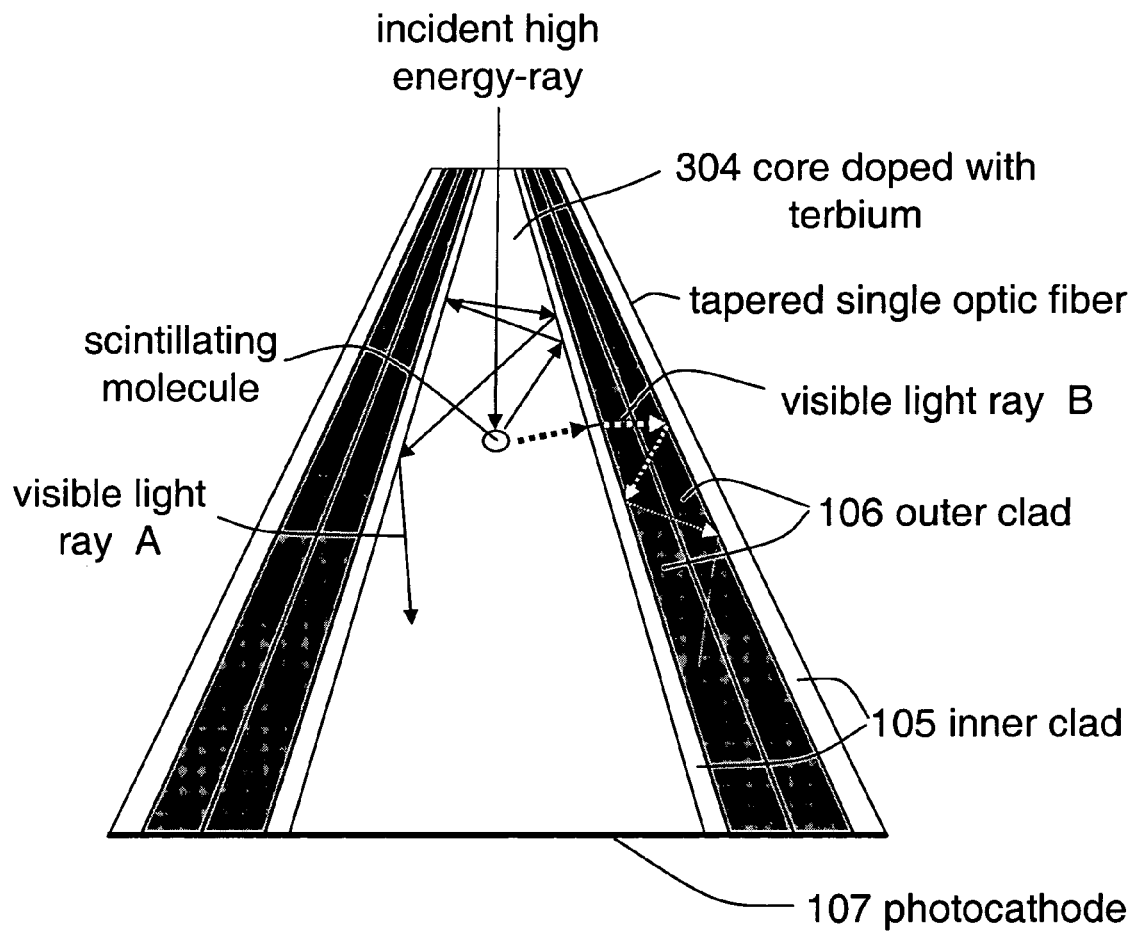
Fig. 13B Total internal reflection in core and outer clad of single tapered scintillating optic fiber

CONTACT-FIELD OPTICAL MICROSCOPE

BACKGROUND OF THE INVENTION

Electromagnetic force plays a main role relating to the great majority of chemical, physical and biological phenomenon in a wide range of material realm from atom to macroscopical objects except the involvements in the domains of atomic nucleus, elementary particles and astrophysics. The physical and chemical properties of the materials are also basically decided by the electromagnetic force. The electromagnetic force is very mighty. In almost all of natural phenomena, electromagnetic force plays an important even decisive role. The basic force of atomic nucleus combining electron to constitute atom, atoms joining together to compose molecules, molecules combining each other to form macroscopic objects (liquid, solid et al), is the electromagnetic interaction.

Electromagnetic force is carried by photons. Electromagnetic radiation, such as light, can be thought of as being composed of photons. Photons of different energies (wavelength) span the electromagnetic spectrum of γ rays, x rays, UV, visible light, infrared, microwave, radio waves, and so forth. Uneven spatio-temporal distribution of energy is the impulse of nature self-organization, information sources of nature complexity and force of nature order. Macroscopical phenomenon of nature strongly depends upon her microscopic state of energy.

Direct or indirect cumulation and application of photon energy is the most important common character of all kinds of life on earth. The energy variation of life relates to low level energy photon, especially infrared radiation.

Since their invention in the late 1500s, light microscopes have improved our knowledge of physical and chemical sciences and clinical and biological research.

The domain of modern microscopy can be divided into three defined approaches: far-field, near-field and contact-field optics. Because of the interference of medium between sample and detector, it is difficult to monitor the dynamic variation of microscopic state of energy in nanometer range of sample by means of far-field and near-field optics.

1. Far-Field and Near-Field Optics

Traditional optical lens equipped microscopes are based on far-field optics, where the distances between the sample and the detector are much larger than the wavelength of the light source. It is well known that the resolution of the far-field optical instruments is originally determined by E. Abbe barrier, it is not finer than $\lambda/2$, where $\lambda$ is the wavelength of the light source. For visible light, it is only about 200 nm.

Unlike traditional microscopes, scanning probe microscopes are near-field microscopes such as scanning tunneling microscopy, atomic force microscopy and near-field scanning optical microscopy, the techniques to overcome the diffraction limit, do not use lenses, so the size of the probe rather than diffraction effects generally limit their resolution. All of these microscopes work by measuring a local property—such as tunneling current, height, optical absorption, or magnetism—with a probe or "tip" placed very close to the sample.

The revolutionary development of scanning probe microscopy has made the imaging of objects at molecular or atomic level possible. The near-field scanning optical microscope, one of the most recent entries in the burgeoning field of scanned probe microscopy, opened the possibilities of ultra-high optical resolution at the nanometer scale which overcomes the Rayleigh diffraction limit. Near-field scanning optical microscope obtains super-resolution optical images by use of a sub-wavelength optical probe. The probe consists of a tapered optical fiber which is coated with a thin opaque metal at the tapered end. The size of the aperture is the dominant factor in determining the resolution of a near-field optical imaging device.

A near-field probe has been developed that yields a resolution of about 12 nm (about lambda/43) and signals about 10,000—to one million-fold larger than those reported previously. With these probes, near-field microscopy appears poised to fulfill its promise by combining the power of optical characterization methods with nanometric spatial resolution, as described in an article by E. Betzig et al. entitled "Breaking the diffraction barrier—Optical microscopy on a nanometric scale," in Science, vol. 251, Mar. 22, 1991, p. 1468–1470.

U.S. Pat. No. 5,633,972 describes a super resolution imaging fiber for subwavelength light energy generation and near-field optical microscopy. The imaging fiber comprises a unitary fiber optical array of fixed configuration and dimensions comprising typically from 1,000 to 100,000 optical fiber strands which terminate at one array end as tapered strand end faces limited in size to a range from about 2–1,000 nanometers in diameter. Overlying these tapered strand end faces is a thin opaque metal coating having a size-limited end aperture ranging from about 2 to less than about 1,000 nanometers in diameter. These size-limited end apertures provide for the generation of a plurality of discrete subwavelength light beams concurrently.

2. Some Contact-Field Optics Related Technologies

Fiber Optic

In recent years it has become apparent that fiber-optics are steadily replacing copper wire as an appropriate means of communication signal transmission. They span the long distances between local phone systems as well as providing the backbone for many network systems. Other system users include cable television services, university campuses, office buildings, industrial plants, and electric utility companies.

A fiber-optic system is similar to the copper wire system that fiber-optics is replacing. The difference is that fiber-optics use light pulses to transmit information down fiber lines instead of using electronic pulses to transmit information down copper lines and fiber optic wire carries much more information than conventional copper wire and is far less subject to electromagnetic interference. Total internal refection confines light within optical fibers. Because the clad has a lower refractive index than that of the core, light rays reflect back into the core if they encounter the clad at a shallow angle. A ray that is less than a certain "critical" angle escapes from the fiber.

U.S. Pat. No. 6,801,698, issued Oct. 5, 2004 relates to high index-contrast fiber waveguides and the materials for forming high index-contrast fiber waveguides. The optical fibers that utilize total internal reflection to confine light to a core can provide enhanced radial confinement of an optical signal in the fiber waveguide. The enhanced radial confinement can reduce radiative losses, thereby improving transmission efficiency. Moreover, in addition to enhanced radial confinement, it is also possible to achieve enhanced axial confinement in the fiber waveguide. The fiber core has a refractive index more than 2.5 (such as 2.8) and the fiber cladding has a refractive index less than 1.45 (such as 1.4). The absolute difference between the refractive indices of the fiber core and cladding is more than 1.2 (such as 1.4).

Fiber Optical Taper

The taper is essentially an aligned bundle of a large number of optically transmissive fibers fused together to form a coherent bundle. Each of the component fibers of the aligned bundle is a filament and composed of a high-index-core material such as glass or quartz surrounded by a lower-index cladding. Only the cores transmit imaging light.

The bundle is heated in the center, stretched and cut into two tapers, forming a truncated cone shape, resulting in variation of its diameter from one end to the other. In this process each fiber is stretched and is tapered as well. When carried out under well-controlled conditions, the stretching process produces a taper having a minimum of image distortion. The diameter of each filament increases uniformly from the minor diameter end of the taper to the major diameter end. When such a fiber optical taper is placed with its small face in contact with an object (zero working distance), an enlarged image appears on the larger face because light from an element of the object field that enters the small end of a given fiber is trapped in the fiber by total internal reflection until it emerges from the large diameter face. The magnification of a taper is simply the ratio of the diameters of the end faces. The magnified image is real and appears at the top face.

In minification, light from an element of an object field enters the large diameter end of a fiber and is "funneled" down to the small diameter end. In either case, the light exiting from the fibers forms a planar image field corresponding to the planar geometry of the exit surface. Magnification over the image field is uniform since the diameters of each fiber end lying in each end surface are identical.

The numerical aperture (NA) of optical fibers and bundles of fibers is a measure of the angular width of the cone of light that is captured by the fibers. This parameter is measured by the maximum angle of obliquity at which an image is still observable on the face of the fiber optical bundle. Beyond this angle the image fades off. For a fiber of uniform diameter (nontapered), the nominal or intrinsic numerical aperture is determined by the glasses which comprise the fiber core and the cladding.

It is given, for a fiber of uniform diameter, by:

$$N.A. = N_0 \sin \alpha = \sqrt{N_1^2 - N_2^2},$$

where $N_0$ is the refractive index of the external medium (for air, $N_0=1$); $N_1$ is the refractive index of the core; and $N_2$ is the refractive index of the cladding. The angle $\alpha$ is the half-angle of the cone of light captured or emitted by the fiber. This parameter is important in the use of a taper as a magnifier because it determines both the light-gathering capability and the angular field of viewing around the taper, from which the enlarged image on the top face of the taper is visible.

Tapered fibers are governed by one important law, $$d_1 \sin \theta_1 = d_2 \sin \theta_2$$

where diameters $d_1$, $d_2$ and angles $\theta_1$, $\theta_2$ are shown in FIG. 1. $d_1$ is the small core end diameter and $d_2$ is the large core end diameter of the tapered optical fiber. $\theta_1$ is the incident light angle and $\theta_2$ is the light angle after several total internal reflections in the fiber core.

The angle of reflection of a light ray is equal to the angle of incidence; therefore, light entering the small end of a fiber becomes more collimated as the diameter increases because the reflecting surface is not parallel to the fiber axis.

In a fiber-optical taper the effective numerical aperture ($N.A._{large\ face}$) is determined by the tapering of the fibers. The reduction of $N.A._{large\ face}$ in such fibers is inversely proportional to the magnification. In a cone-shaped fiber the following relations hold for the angles $\alpha$ and $\alpha'$ at the two ends:

$$\sin \alpha' = \sin \alpha / M,$$

$$NA_{large\ face} = N.A._{small\ face} / M,$$

where M is the magnification, $\alpha$ and $\alpha'$ are the obliquity angles at the small and the large ends, respectively. In general, it is desirable for $NA_{large\ face}$ of the taper to be as large as possible. Obtaining a high nominal NA in turn requires the use of a core glass with a high refractive index, or a very-low-index cladding glass, or both.

Image resolution in fiber bundles is generally related to the fiber size. The fiber optic resolution is shown in FIG. 2. For static resolution (no scanning), a commonly used criterion for resolution is:

$$1/3d < R < 1/2d$$

where d is the diameter of the fiber in millimeters and R is the resolution in line pairs.

Each fiber in the taper is composed of a high-index-core glass surrounded by a lower-index cladding. The light transmission of a fiber-optical taper is given in terms of (1) the internal transmittance of the core glass of the fibers, (2) the Fresnel reflection losses at the faces, and (3) the packing fraction (PF). The PF is the ratio of core area to the total taper face area (i.e., core plus cladding). The thinner the cladding relative to the core, the higher the PF. The P.F. of commonly used tapers is on the order of 50% to 75%. The non-imaging light transmitted by the cladding in turn limits the contrast transferred through the taper.

Thus the transmission through the cores is given by:

$$T = PFt_f \exp(-\beta_\lambda L),$$

where $t_f$ is the Fresnel transmission factor, $\beta_{80}$ is the absorption coefficient of the core glass, and L is the length of the taper.

U.S. Pat. No. 6,801,697, issued Oct. 5, 2004, describes a view fiber optic taper. The apparatus comprises a bundle of optic fibers having a base end and a viewing end. When the small end of a fiber optic taper is placed in contact with an object such as a printed page, an enlarged image appears at the upper, larger face of the taper. Specifically, the size of the transmitted image is in direct proportion to the change in size of the two ends of the fiber optic taper. Size ratios, i.e., magnifications, of from nearly unity to as much as 10:1 may be practically obtained using a fiber optic taper. Each fiber in the bundle transmits one "pixel" of light from an image at one end of the fiber optic taper to the other end of the taper.

U.S. Pat. No. 5,600,751, issued Feb. 4, 1997, relates to fiber optic reading magnifiers. A reading magnifier formed by a bundle of juxtaposed longitudinally tapered optical fibers having a viewing end and a flat base end. The viewing end of the optical fiber bundle is at the larger end. Their main advantage over other reading aids is their relative stability and ease of use. The fixed and stable distance from the reading material and the flexibility in distance from the eye to the magnifier make their use easy to learn.

Fiber-optic tapers do not exhibit any of the so-called Seidel aberrations of lenses, such as spherical aberration, chromatic aberration, coma, or astigmatism. When properly made, they exhibit no significant distortion.

Tapered image conduit is available in round, square, and hexagonal formats and can be fabricated in the form of almost any regularly shaped polygon. Tapers may be used both for the magnification and for the minification of objects.

FIG. 3 shows a square grid pattern can be easily magnified by a fiber optical taper without focusing.

FIG. 4 shows the structure of compound eye of the insects. The compound eye is the most common eye in the nature. It is an array of tapered fibers, each forming a narrow acceptance angle and each looking in a different direction.

Multiple Channel Ion Sensitive Micro-Electrodes

Multiple channel ion sensitive micro-electrodes have a tapered glass capillary structure produced by heating and pulling technologies to generate very tiny tapered glass tip with nano-meter diameter opening. The structure of two channel ion sensitive microelectrode is shown in FIG. 5.

Ion sensitive microelectrodes provide a means of directly assessing the living cell extra cellular or intracellular activities of organic or inorganic ions and for making prolonged measurements of these without great damage to the living cell. The advantage of the ion-sensitive microelectrode is its very high spatial resolution. Multiple channel ion sensitive microelectrode is a good example to demonstrate how high the spatial resolution of a multiple channel chemical sensor could be. The tip outer diameter of two barrel ion-sensitive microelectrode can be made about 0.1 um. Each channel inner diameter of the chemical sensitive area at the tip opening of the microelectrode may be as small as 20 nm.

Several important neuro-transmitters (acetylcholine, serotonin and histamine) and bile acid ion sensitive microelectrodes have been described in the following references:

Bi Yu, Chinese Patent 87104761, "The liquid ion exchanger compounds for acetylcholine ion sensitive microelectrode", issued on May 1990.

Bi Yu, et al. "Miniaturization of a liquid membrane sensor for the determination of bile acids," Biosensors & Bioelectronics 5 (1990) 215–222.

Bi Yu, "Histamine selective microelectrode based on synthetic organic liquid ion exchanger," Biosensors 1989, 4, 373–380.

Bi Yu, "A newly developed ion selective microelectrode suitable for determination of serotonin." Chinese J. Physiological Science 1989, 5 (1), 10–17.

In the U.S. Pat. No. 6,396,966, Lewis, et al. described a glass structures for nanodelivery and nanosensing. The techniques described in this patent can produce high efficiency throughput of light through tapered glass structures with subwavelength apertures at the tip are unique and permit the generation of ultra small spots of light that could extend to below 20 nm with significant intensities of light in these tips. In addition with small amendations these structures can be altered for excellent delivery of nanoquantities of chemicals with nanometric control of chemistry using the force sensing capabilities of these structures and other uses such as combined force and ion sensing etc.

Capillary Lens

It is well known that hollow glass capillaries can act as waveguides for x-rays by means of the multiple total external reflections of x-rays from the smooth inner walls of the capillary channels. Reflection of the x-ray photons occurs at the boundary between media with different refractive indices. When an x-ray strikes the reflecting surface of a capillary at a grazing angle greater than the critical angle of the material, it undergoes total external reflection. X-rays satisfying the total reflection condition can be effectively transported through the capillary channels.

Polycapillary X-ray optics formed from millions hollow glass channels bundled and fused together and tapered to desired profiles have been used to control x-ray beams for many varied applications. One of the distinguishing features of polycapillary optics is their broad energy (wavelength) bandwidth.

U.S. Pat. Document No. 2004000062347, issued Apr. 1, 2004 relates to X-ray microscope in which the placement of the test object is located between extended X-ray source and lesser end side of the X-ray capillary lens and the resolution is fully determined by dimension of the channel entrance of the capillary lens.

Fiber Optic Scintillating Plates

Fiber optic scintillating plates or fiber optic scintillators are structurally identical to standard fiber optics and formed from an array of scintillating glass fibers disposed substantially parallel to one another. The core of each of the glass fibers is doped with a scintillating material such as terbium to emit visible light when exposed to x-rays, UV light or ionizing particles. The surface of each of the glass fibers is clad with a non-scintillating, lower optical index glass material which is essential in minimizing cross-talk between fibers. Therefore the produced visible light as a result of x-ray absorption within each fiber core will be channeled and directed toward the imaging sensor, such as a CCD. To capture more of this light, the input side of the plate is usually coated with a reflective material, such as aluminum. This has the effect of re-directing that portion of the light which propagates back toward the input face. The fiber optic scintillating plates can produce images with very high resolution due to the discrete and channelized nature of the emission of light within the core of each fiber. The thickness of fused faceplates is a function of the energy of the radiation to be converted. Fiber optic scintillators are generally suitable for medical imaging, for example, using x-rays having energies of about 50 KeV to about 80 KeV.

U.S. Pat. No. 5,391,320 Buchanan, et al. February, 1995, relates terbium activated silicate luminescent glasses. Terbium glass fiber optic scintillators offer an easy solution for X-ray and γ-ray detectors at higher energy. (10 kV Upwards) The conversion efficiency is lower at around 10 photons per keV, but since all the light is channeled down the fibers, the thickness can be made whatever is necessary to achieve efficient absorption.

U.S. Pat. No. 5,554,850, issued September, 1996 relates to X-ray scintillating plate utilizing angled fiber optic rods.

U.S. Pat. No. 6,384,400 issued May, 2002 relates to a high resolution and high luminance scintillator. In this patent, a fiber optic scintillator having a plurality of double clad radiation absorbing fibers is described. Each of radiation absorbing fibers includes an inner scintillating fiber surrounded by an outer radiation absorbing clad. Inner scintillating fiber desirably comprises a scintillating glass fiber core with a lower optical index glass clad to increase the critical angle for internal reflection of light. Outer radiation absorbing clad desirably comprises a high-density glass. The initial double clad radiation absorbing fibers are formed, for example, by inserting the scintillating fiber inside of a lower optical index glass tube and then inserting the assembly into a larger high-density glass tube. This assembly is then heated and drawn down to a smaller diameter either before or after assembling into a fiber bundle.

Night Vision Optic Image Intensifier

Night vision devices were developed for military use to enhance our night vision. The device includes an objective lens which focuses invisible infrared light from the nighttime scene through the transparent window member, a vacuum chamber carrying a photocathode behind the transparent window member, a micro channel plate (MCP), a phosphor screen on the inner surface of a fiber optic faceplate and a high-voltage power supply. A visible image on phosphor screen which is deposited on the image output window of the out surface of the fiber optic faceplate is then presented via an eyepiece lens to a user of the device as shown in FIG. 6.

The device both amplifies the image from the scene and shifts the wavelength of the image into the portion of the spectrum which is visible to humans, thus to provide a visible image replicating the scene.

The photocathode is responsive to photons of visible and infrared light of an image of a night-time scene to liberate photoelectrons which are moved by a prevailing electrostatic field to a micro channel plate causing a geometric cascade of secondary-emission electrons moving along the micro channels, from one face of the micro channel plate to the other so that a spatial output pattern of electrons (which replicates the input pattern; but at an electron density which may be, for example, from one to several orders of magnitude higher) issues from the micro channel plate. This pattern of electrons is moved from the micro channel plate to a phosphorescent screen by another electrostatic field. When the electron shower from the micro channel plate impacts on and is absorbed by the phosphorescent screen electrode, visible-light phosphorescence occurs in a pattern which replicates the image.

The necessary electrostatic fields for operation of a night vision device are provided by a high voltage electronic power supply.

Proximity-focused intensifiers are free from geometrical distortion or shading because the photoelectrons follow short, direct paths between the cathode, output screen, and the MCP rather than being focused by electrodes. The overall photon gain of these devices averages about 10,000, which is calculated according to the equation:

$$\text{Gain} = QE \times G(mcp) \times V(p) \times E(p)$$

where QE is the photocathode quantum efficiency (0.1 to 0.5 electrons/photon), G(mcp) is the micro channel plate gain (averaging between 500–1000), V(p) is the voltage between the MCP and the output phosphor (around 2500–5000 volts), and E(p) is the electron-to-light conversion efficiency of the phosphor (0.08–0.2 photons/electron). The gain of the micro-channel plate is adjustable over a wide range with a typical maximum of about 80,000 (a detected photon at the input leads to a pulse of 80,000 photons from the phosphor screen).

As shown in FIG. 7, photons in the energy range of 10 eV–1 keV (VUV) are strongly attenuated by air, but can be imaged in vacuum by phosphor screens, or micro channel plates. The detection efficiency of a micro channel plate for photons is a function of incidence and photon energy. Typical efficiency is 10% falling away at both low energy and high energy. The efficiency can be increased to around 20% by coatings such as CsI, but the thickness of this should be optimized for the desired photon energy. Photon energy in 1–50 kV can be imaged by inorganic powder scintillators providing 20–30 visible photons per absorbed kV. At high photon energies the thickness of the scintillator required for good absorption efficiency increases.

The time resolution of image intensifiers and micro channel plates is largely dependent on the readout system.

Other examples of electronic transducers or image capture devices that may be utilized include CMOS image sensors, and other detectors (such as ferroelectric detectors) which provide an electronic signal in response to an electron flux.

Different photocathode quantum efficiencies are shown in FIG. 8. The latest generation of image intensifiers (denoted blue-plus Gen III or sometimes Gen IV) employs smaller microchannels (6 micron diameter) and better packing geometry than in previous models with a resultant substantial increase in resolution. The broad spectral sensitivity and high quantum efficiency of the "high blue" GaAs and gallium arsenide phosphide (GaAsP) photocathodes are ideally suited to applications in fluorescence or low-light-level microscopy.

3. Some Drawbacks and Needs

A lot of references clearly indicate that many efforts have been made to develop a subwavelength to nanometer spatial resolution, high time resolution, high image contrast microscope that is relatively easy to operate, less expensive, no focusing, requires little or no specimen preparation, and is relatively portable and small enough for use in the field, provides an enhanced field of direct-view, low distortion brighter images, minimizing or avoiding the need for raster scanning, including several of the attractive features of optical microscopy, such as nondestructiveness, low cost, high speed, reliability, versatility, accessibility, and informative contrast. This invention is one of the efforts among them and is concerning the following points which need to be developed or improved.

Spherical Aberration, Chromatic Aberration and Astigmatism

Fiber-optic tapers do not exhibit any of the so-called Seidel aberrations of lenses, such as spherical aberration, chromatic aberration, coma, or astigmatism. When properly made, they exhibit no significant distortion.

It is need to develop an optical microscope that applies fiber-optical taper instead of lens as the image detector to avoid the image aberrations mentioned above.

Zero Working Distance

The distances between the sample and the detector of traditional optical lens equipped microscopes are much larger than the wavelength of the light source. They are based on far-field optics. Scanning probe microscopes such as scanning tunneling microscopy, atomic force microscopy and near-field scanning optical microscopy, working by measuring a local property—such as height, optical absorption, or magnetism—with a probe or "tip" placed very close to the sample, are near-field microscopes. Both of these two kinds of microscopes can not decrease the working distance to zero and therefore can not avoid the interference of the medium between the sample and the image detector.

As shown in FIG. 9, traditional projection roentgenoscopy is a contact-field imaging method. In such methods and devices, the visible image of the object's internal structure, for example, tissues of a biological object, is obtained as a shadow projection. Density of the acquired image in each of its points is determined by the total attenuation of X-rays that passed through the object on their way from the source to the detection means such as a fluorescent screen or an X-ray film, which is held in contact with the object.

The contact imaging method does not use any far-field enlarging optical system and hence does not cause any aberration and the image of the specimen is blurred scarcely because the specimen is held in contact with the fluorescent screen. Thus, in principle, the contact imaging method is able to form an image of high resolution. The resolution achievable by the contact imaging method is dependent on the particle size of the fluorescent screen. The contact imaging method is able to form images of a very high resolution if the fluorescent screen resolution is high enough.

Japan Pat. 3,573,725, issued February 2003, and U.S. Pat. Document No 20040005026 A1 issued January 2004, relate to X-ray microscope apparatus. The X-ray microscope apparatus (as shown in FIG. 10) holds a specimen on a photocathode in close contact condition, and irradiates the specimen from behind with X-rays generated by the X-ray generator to form an electron image of the specimen by X-rays penetrated the specimen on the photocathode. Then, the electron image enlarging device pulls electrons emitted by the electron image to accelerate the electrons for travel in a direction opposite a direction toward the X-ray generator, and forms an enlarged electron image on the surface of the electron beam detecting device. The image processing device processes the electron image formed on the surface of the electron beam detecting device to display a visible image. Parts of the photocathode irradiated with incident X-rays emit amounts of photoelectrons according to the intensities of the incident X-rays fallen thereon, respectively, to form an electron image corresponding to the X-ray image.

As shown in FIG. 10, the photocathode is attached to the inner surface of an entrance window, which is covered with an X-ray transmitting film. The sample is held by the outer surface of the entrance window. It is clear that the sample and photocathode are separated by entrance window. They are not in contact with each other and the working distance is not zero.

U.S. Pat. No. 5,045,696, issued Sep. 3, 1991 relates to a photoelectron microscope in which a specimen holder comprises a support layer on one surface of which said specimen is held in contact therewith and a photocathode in contact with the opposite surface of said support layer, and wherein said chamber is provided with a window which is composed of said specimen holder, with said specimen exposed outside chamber and said photocathode disposed inside said chamber. a specimen holder, which comprises a support layer, on the upper surface of which is the specimen in close contact therewith, and a photocathode layer attached to the opposite surface of the support layer. The support layer can be a membrane made of $Si_3N_4$ and having a thickness of the order of 1000 ANG. Again, the specimen and photocathode are separated by a specimen holder and its thickness is about 1000 ANG.

There is further a need for the optical microscope that can work truly at zero working distance to enhance the image spatial resolution and contrast and to expel the interference of medium which exists between sample and image detector when the working distance does not equal zero.

Optical Taper Image Contrast Transfer

Optical taper high quality image contrast transfer is very important for the fiber optical taper as an image magnifier. There are two critical factors which will strongly influence the quality of optical taper image contrast transfer.

The first criterion is that the cladding areas have a smaller index of refraction than the core areas in order for total internal reflection to take place within the core areas. The portion of the light emitted at an angle less than the optical critical angle for the fiber exits the side of the glass fiber and thus may impinge on and be detected elsewhere by the light sensitive imaging sensor. This latter portion of the light or so called fiber-to-fiber cross-talk results in image quality degradation. The high index-contrast optical fiber decreases the extent of fiber-to-fiber cross-talk and provides enhanced radial confinement of an optical signal in the fiber core.

The second criterion is the non-image forming light in the cladding. Loss in contrast transfer through the taper is primarily due to the percentage of non-image-forming light transmitted by the cladding of the taper. The cladding material occupies about 25–30% of the commonly high resolution taper's face area. This large amount of non-imaging (scattered) light limits the ratio of contrast transferred through the taper. Further increase in contrast can be achieved by a method called end blocking in which the clad portion at the large face is removed and replaced by a black material. If the taper design contains extramural absorber (EMA), the stray light through the cladding can be eliminated. The EMA is provided by incorporation of small black glass rods between the clear clad fibers. These absorbing rods, although covering only a small fraction of the cladding area, are able to absorb almost all the stray light in the cladding, leading to a substantial reduction in light scatter in the taper and thus significantly increasing the contrast transfer. If the cladding area is a light blocking material, such as a black matrix material, then the additional benefit of improvements in the on-axis contrast can be obtained.

U.S. Pat. No. 6,801,698, issued Oct. 5, 2004 relates to high index-contrast fiber waveguides and the materials for forming high index-contrast fiber waveguides. The optical fibers that utilize total internal reflection to confine light to a core can provide enhanced radial confinement of an optical signal in the fiber waveguide. The enhanced radial confinement can reduce radiative losses, thereby improving transmission efficiency. Moreover, in addition to enhanced radial confinement, it is also possible to achieve enhanced axial confinement in the fiber waveguide. The fiber core has a refractive index more than 2.5 (such as 2.8) and the fiber cladding has a refractive index less than 1.45 (such as 1.4). The absolute difference between the refractive indices of the fiber core and cladding is more than 1.2 (such as 1.4).

A tapered coherent fiber bundle imaging device for near-field optical microscopy is described in U.S. Pat. No. 6,016,376 by Ghaemi et al., in which a subwavelength-resolution optical imaging device is provided. The device comprises a coherent fiber bundle and each optical fiber comprises a core having an index of refraction $n_1$ and a cladding having an index of refraction $n_2$ thereby providing a value N.A., where:

$$N.A. = \sqrt{N_1^2 - N_2^2}.$$

Light is effectively confined within the core of each fiber without need for a separate coating applied to the fibers by selecting the values of $n_1$ and $n_2$ for each optical fiber so as to provide a value for N.A. which permits at least a predetermined fraction of the light launched into each optical fiber at the sampling end of the coherent fiber bundle to be conveyed through the optical fiber to the observation end of the coherent fiber bundle, and which restricts crosstalk between adjacent optical fibers of the coherent fiber bundle to a predetermined level.

For a high magnifying fiber optical taper, the methods mentioned above is not simple enough and effective enough to confine the image light in optical fiber core and to block all of non-image forming light in the cladding totally. It is still need to provide a simple and effective method by which an optical taper is formed by high index-contrast fiber with an extra-radiation absorbing cladding to eliminate all of the stray light in the cladding.

Medium Interference Between Sample and Detector

Macroscopical phenomenon of nature is strongly depending upon her microscopic state of energy. The energy variation of life relates to low level energy photon, especially infrared radiation.

The measurement of infrared radiation is complicated by the fact that water and bodily fluids are opaque to infrared light. Consequently, even the slightest amount of water, bodily fluids, moisture, $CO_2$ and many other medium on the collection end of a probe impairs the collection of infrared light. As a result, conventional far-field and near-field optics is not good enough to be used in infrared procedures where moisture or bodily fluids are present.

In an article by Lewis A., et al entitled "Near-field optics: from subwavelength illumination to nanometric shadowing," Nature Biotechnology 21, 1378–1386 (2003) Lewis A. et al described: "Probably the most exciting application of this sort of external illumination protocol is the imaging of chemical alterations in a sample by monitoring the scattering of infrared radiation within the region of the electromagnetic spectrum where vibrational modes of surface molecules absorb light in chemically specific ways. Such chemical identification with high spatial resolution is very important for numerous areas of interest in biology. These extend from the chemical identification of molecular entities on biochips to the spatially resolved nanometric imaging of highly compartmentalized cell membranes. Of course, application of this latter methodology to biological imaging is subject to the problem of high absorption of infrared radiation by water".

There is indeed a need to provide a microscope which can work at zero working distance to expel the interference of the medium between sample and detector and to obtain a dynamic functional imaging with high spatial and time resolution and with broad-spectrum.

Optical Taper Image Pre-Enlargement

The prior art are exemplified in Japan Pat. 3,573,725, issued February 2003, and U.S. Pat. Document No 20040005026 A1 issued January 2004, entitled X-ray microscope apparatus described that a specimen is held on a photocathode in close contact condition, and irradiates the specimen from behind with X-rays generated by the X-ray generator to form an electron image of the specimen by X-rays penetrated the specimen on the photocathode without any pre-magnification. Then, the electron image enlarging device pulls electrons emitted by the electron image to accelerate the electrons for travel in a direction opposite a direction toward the X-ray generator, and forms an enlarged electron image on the surface of the electron beam detecting device.

In principle, the contact imaging method without any pre-magnification is able to form images of a very high resolution if the resolution of photocathode and micro-channel plate is high enough. The resolution achievable by the contact imaging method without any pre-magnification is dependent on the photocathode and micro-channel plate spatial resolution which is not high enough for the microscope need.

It is necessary to provide a microscope with optical taper as image pre-magnifier to pre-enlarger the sample image in order to match the limited resolution of photocathode and micro-channel plate.

Spatial and Time Resolution

The resolving power of a microscope is one the most important feature of the optical system and influences the ability to distinguish between fine details of a particular specimen. The demand for the dynamic information focused on the physics and chemistry of microstructures at submicron and nanometer scale range to challenge in microscopy and spectroscopy today is not only the improvement of finer and finer resolution, but also the development of techniques for observing sample events in real time, as they happen, without destroying the sample in the process. However, conventional scanning probe microscopes generate images of sample areas slowly due to the sequential imaging of small, discrete points of sample areas required by the raster scanning technique.

There is further a need for an optical microscope that provides high resolution real-time image in normal atmosphere and temperature and in natural state and environment, without interference from the artifacts of specimen preparation, without destroying or altering sensitive biochemical characteristics, and without disturbing the specimen.

Combination of Optical and Electron Enlargement

Electron image has short wavelength, high resolution, no medium (such as water, air et al) interference in vacuum condition and is easy to be magnified by electromagnetic lens. The magnification of the electron image enlarging device can continuously be varied by adjusting currents supplied to the magnetic lenses. Therefore, a minute object can precisely be located and observed by determining the position of the object using the electron image enlarging device at a low magnification and displaying a desired object at a high magnification. Unlike electron image, the magnification of optical taper image is limited and difficult to adjust.

Although electron microscopes offer very fine resolution, the specimen must be prepared by high-vacuum dehydration and is subjected to intense heat by the electron beam, making observation of living specimens impossible. The dehydration process also alters the specimen, leaving artifacts and sample damage that were not present in nature.

It is real need to develop a microscope that use optical taper as zero-working distance interface to transfer sample optical image into vacuum chamber to combine the advantages of high resolution, high magnification characters of electron microscope and to avoid keeping sample in vacuum condition.

Photon Input Flux Density Adjustable Intensifying

The overall photon gain of image intensifier averages about 10,000, which is calculated according to the equation:

$$\text{Gain} = QE \times G(mcp) \times V(p) \times E(p)$$

where QE is the photocathode quantum efficiency (0.1 to 0.5 electrons/photon), G(mcp) is the micro channel plate gain (averaging between 500–1000), V(p) is the voltage between the MCP and the output phosphor (around 2500–5000 volts), and E(p) is the electron-to-light conversion efficiency of the phosphor (0.08–0.2 photons/electron).

The gain of the micro-channel plate is adjustable over a wide range with a typical maximum of about 80,000 (a detected photon at the input leads to a pulse of 80,000 photons from the phosphor screen).

It is useful to provide a microscope that can adjust photon input flux density by changing the gain of the micro-channel plate to satisfy different irradiation of the sample.

Fiber Optic Scintillating Taper

Fiber optic scintillating plates or fiber optic scintillators are structurally identical to standard fiber optics and formed from an array of scintillating glass fibers disposed substantially parallel to one another. The core of each of the glass fibers is doped with a scintillating material such as terbium to emit visible light when exposed to x-rays, UV light or ionizing particles. The surface of each of the glass fibers is clad with a non-scintillating, lower optical index glass material which is essential in minimizing cross-talk between fibers. Therefore the produced visible light as a result of x-ray absorption within each fiber core will be channeled and directed toward the imaging sensor, such as a CCD.

To capture more of this light, the input side of the plate is usually coated with a reflective material, such as aluminum. This has the effect of re-directing that portion of the light which propagates back toward the input face.

The fiber optic scintillating plates can produce images with very high resolution due to the discrete and channelized nature of the emission of light within the core of each fiber. The thickness of fused faceplates is a function of the energy of the radiation to be converted.

The fiber optic scintillating plates described above can work as contact-field model, but can not act as a sample image magnifier and require the coating with a reflective material, such as aluminum on the input side of the plate to re-directing the portion of the light which propagates back toward the input face.

There is a need to develop a fiber optic scintillating taper which does not need to coat a reflective material on the input side of the taper and can not only work as contact-field model but also can work as sample image magnifier. The microscope with this fiber optic scintillating taper can invert γ-ray, x-rays, UV light or ionizing particle sample image to an enlarged visible light image.

SUMMARY OF THE INVENTION

The present invention relates to a contact-field optical microscope having broad-spectrum and high spatial and time resolution (visible light, infrared, UV, X-ray and charged particle). The device comprises a fiber optical taper, a photocathode, a vacuum chamber, a magnetic lens photo-electron image enlarging device, a micro-channel plate image intensifier, a phosphor screen, a high voltage power supply for MCP image intensifier, an electronic control circuit for magnetic lenses, a faceplate and a Charged Coupled Devices (CCD). The optical taper has a small sampling face and a large imaging face. The side of the optical taper is embedded in a light absorbing opaque glass to prevent background radiation interference. The "contact-field" is intended to express the fact that the sample is placed directly in contact with the surface of the sampling face of the optical taper. An enlarged image of the sample is obtained on the imaging face. This pre-amplified image on the imaging face of the optical taper is converted into a photo-electron image by photocathode which is deposited on the surface of the imaging face of the optical taper. The magnification is in simply the ratio of the diameters of the imaging and sampling face. The photoelectron image is further enlarged by magnetic lenses and intensified by micro-channel plate. The wavelength of the enlarged electron image is shifted into the portion of the spectrum which is visible to humans by phosphor screen.

The high voltage power supply for micro-channel plate image intensifier and the electronic control circuit for magnetic lens are not described in the text and are not shown in the Figures of present invention because they are all well known in electronic industry and already widely applied in the fields of night vision device and electronic microscope.

The fiber optical taper comprises a plurality of high index-contrast optical fibers disposed substantially coaxially along their length. Each high index-contrast optical fiber comprises a high optical refractive index core glass and double clad (an inner thin lower refractive index glass cladding and an outer thick radiation absorbing high refractive index glass cladding) and permits the light that is emitted, reflected or transmitted by a sample to enter into each optical fiber core at the sampling face of the taper to be carried through the optical fiber to the imaging face without obvious crosstalk between adjacent optical fibers of the taper. The relative orientation of the individual fibers throughout the length of the fiber optical taper is maintained and any pattern of illumination incident at the sampling face of the fiber optical taper re-emerges from the imaging face with the image preserved. Imaging fiber bundles can be made in a variety of shapes and sizes, with the most common having a circular cross section.

The inner clad material of each optical fiber occupies about 10% of each optical fiber total cross section area and the outer clad material of each optical fiber occupies about 20% of each optical fiber total cross section area.

The core cross sectional diameter of each optical fiber at the sampling face is in the range of nanometer, thereby providing nanometer resolution of the sample image.

One of the embodiments of present invention relates to the contact-field infrared microscope. The core glass of the fiber optical taper of the contact-field infrared microscope is composed by infrared fiber optic glass such as chalcogenide glass.

In another embodiment of present invention related to contact-field UV, X-ray and charged particle microscope, the core glass of the fiber optical taper is doped with a scintillating material such as terbium to emit visible light when exposed to x-rays, UV light or ionizing particles.

BRIEF DESCRIPTION OF THE DRAWINGS

FIG. 1 schematically shows incident light transmission in tapered optical fiber;

FIG. 2 schematically shows the relationship between fiber optic resolution and fiber core diameter;

FIG. 3 schematically shows a fiber optic taper magnifier;

FIG. 4 schematically shows the structure of the compound eye of insects;

FIG. 5 schematically shows the structure of two channel ion-sensitive microelectrode;

FIG. 6 schematically shows the structure of night vision device;

FIG. 7 schematically shows the relationship between photon energy and quantum efficiencies;

FIG. 8 schematically shows the relationship between photon wavelength and quantum efficiencies;

FIG. 9 schematically shows the principle of projection roentgenoscopy;

FIG. 10 schematically shows the structure of an X-ray microscope apparatus;

FIG. 11A schematically shows the first embodiment, visible light contact-field optical microscope of present invention;

FIG. 11B shows an enlarged perspective view of the fiber optical taper portion of FIG. 11A, in isolation (including the fiber optical taper embedded in the opaque glass) of the first embodiment (visible light contact-field optical microscope of present invention);

FIG. 11E schematically shows total internal reflection critical angle in single tapered optical fiber of the first embodiment (visible light contact-field optical microscope of present invention);

FIG. 11F schematically shows light total internal reflection and absorption in outer clad of single tapered optical fiber of the first embodiment (visible light contact-field optical microscope of present invention);

FIG. 12A schematically shows the second embodiment, infrared contact-field optical microscope of present invention;

FIG. 13A schematically shows the third embodiment, UV, X-ray, and charged particle contact-field optical microscope of present invention;

FIG. 13B schematically shows total internal reflection in core and outer clad of single tapered scintillating optical fiber of the third embodiment (UV, X-ray, and charged particle contact-field optical microscope of present invention);

DETAILED DESCRIPTION OF THE PREFERRED EMBODIMENTS

Figure 11C:
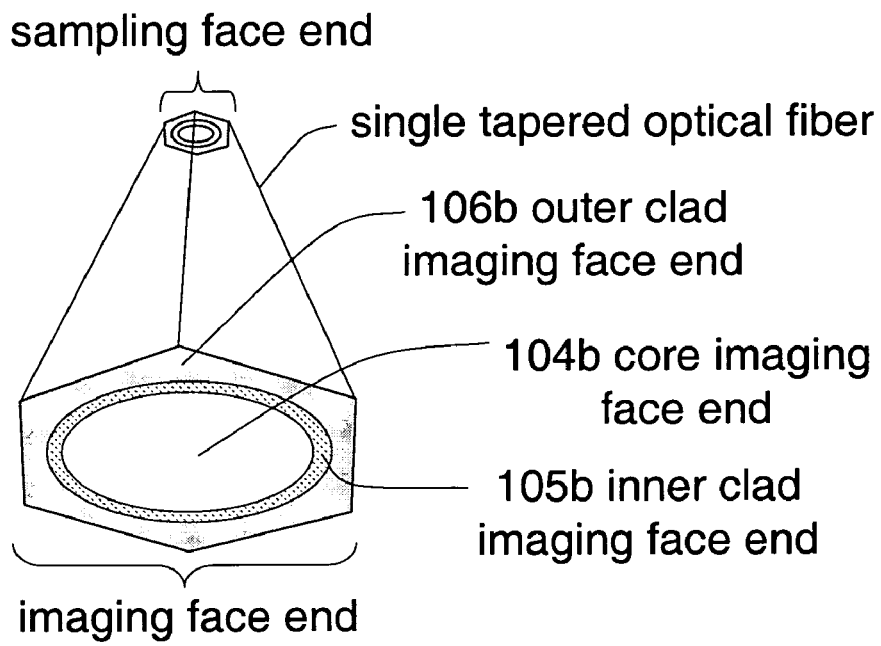
FIG. 11C provides a perspective view of a double clad tapered single optical fiber portion in isolation (including the optical fiber core, inner clad and outer clad) from the fiber optical taper of the first embodiment (visible light contact-field optical microscope of present invention)

Three embodiments of the invention relating to visible light, infrared and UV, X-ray, charged particle contact-field optical microscopes have been described in detail with reference to the FIGS. 11A, 11B, 11C, 11D, 11E, 11F, 12A, 12B, 12C, 13A and 13B.

Visible Light Contact-Field Optical Microscope (FIGS. 11A, 11B, 11C, 11D, 11E, 11F)

FIG. 11A is a schematic diagram of main portions of a contact-field optical microscope working at the range of visible light.

In this embodiment, the microscope comprises a fiber optical taper 103, a photocathode 107, a vacuum chamber 117, magnetic lenses 114a and 114b, a micro-channel plate (MCP) image intensifier 112, an image display phosphor screen 118, a high voltage power supply for MCP image intensifier, an electronic control circuit for magnetic lenses, a faceplate 119 and a CCD 120. The side 111 of the optical taper 103 is embedded in a light and radiation absorbing dark colored opaque glass 110 to prevent background light and radiation (such as X-ray) interference. Fiber optical taper 103 comprises a tapered coherent bundle of optical fibers, and includes a small diameter sampling face 102 and a large diameter imaging face 108. Sample 101 is placed directly in contact with the surface of the sampling face 102 of the fiber optical taper 103. The sampling face 102 is in the middle of the sample holder 109 which is formed by black colored heavy density radiation absorbing opaque glass 110 surrounding the sampling face 102. The surface of the sampling face 102 and the surface of the sample holder 109 are at the same plane and there is no opaque glass on the surface of the sampling face 102. Each optical fiber of fiber optical taper 103 comprises a core 104, an inner clad 105 surrounding the core 104 and an outer clad 106 surrounding the inner clad 105.

The inner clad material of each optical fiber occupies about 10% of each optical fiber total cross section area and the outer clad material of each optical fiber occupies about 20% of each optical fiber total cross section area.

The core 104, inner clad 105 and outer clad 106 have different indices of refraction. The different indices of refraction of the core 104 and the inner clad 105 allow each optical fiber to guide and convey light within the core 104 of the fiber from one end of the optical fiber to the other. The resolution of the image is limited by the diameter of the core 104 of each optical fiber, and dark spots appear in the regions occupied by the inner clad 105 and the outer clad 106 of the optical fibers. The core 104 of the optical fiber is made of a visible light transmissible high refraction index glass.

The cross-sectional diameter of imaging face 108 is larger than that of sampling face 102 which thereby provides a discrete pre-magnifier of the sample image viewed through sampling face 102. The sample 101 is placed directly in contact with the surface of the sampling face 102 of the fiber optical taper 103. Light which is emitted, reflected or transmitted by the sample 101 is accordingly launched into the sampling face 102 of fiber optical taper 103, and is conveyed through each optical fiber core 104 of fiber optical taper 103 to the imaging face 108 of fiber optical taper 103, thereby presenting an enlarged high resolution image at the imaging face 108 of the fiber optical taper 103.

The imaged area is determined by the cross-sectional area of the sampling face 102. The magnification of the optical taper is simply the ratio of the diameters of the sampling face 102 and imaging face 108.

The enlarged high resolution sample image at the imaging face 108 is converted to photo-electron image by photocathode 107 which is deposited on the surface of the imaging face 108 of the optical taper 103. The photoelectron image in the vacuum chamber 117 is further enlarged by magnetic lenses 114a and 114b and intensified by micro-channel plate 112. The electron beam 116 of the enlarged photo-electron image is converted to visible light image by phosphor screen 118 and through faceplate 119 coupling to CCD 120.

A vacuum chamber 117 is formed by chamber wall 115, photocathode 107 which is deposited on the surface of imaging face 108 and phosphor screen 118 which is deposited on the inner surface of faceplate 119. The terminals 113a, 113b, 113c and 113d are ohmically attached to photocathode 107, micro-channel plate 112 and phosphor screen 118 in order to supply suitable working voltages to them.

The high voltage power supply for image intensifier and the electronic control circuit for magnetic lens are not described in the text and are not shown in the Figures of present invention because they are all well known in electronic industry and already widely applied in the fields of night vision device and electronic microscope.

FIG. 11B provides an enlarged perspective view of the fiber optical taper portion of FIG. 11A, in isolation (including the fiber optical taper 103 embedded in the opaque glass 110). In order to show the detailed structure of the fiber optical taper, the sampling face 102 of the fiber optical taper 103 is greatly out of proportionally enlarged and simplified. The real diameter of the sampling face 102 is in submillimeter to millimeter range. The sampling face 102 contains millions of very tiny tapered optical fiber sampling face ends. The diameter of each sampling face end is in nanometer range. Each optical fiber sampling face end comprises a core sampling face end 104a, an inner clad sampling face end 105a and an out clad sampling face end 106a on the surface of the sampling face 102. The real diameter of the sample holder 109 is in centimeter range.

In order to show some fine structures of the invention, the figures in present invention are not exact proportional drawing, therefore the invention is not limited in any way by the proportion of the figures.

FIG. 11B shows the sampling face 102 is in the middle of the sample holder 109 which is formed by black colored heavy density radiation absorbing opaque glass 110 surrounding the sampling face 102. The surface of the sampling face 102 and the surface of the sample holder 109 are at the same plane and there is no opaque glass on the surface of the sampling face 102. The core sampling face end 104a is surrounded by the inner clad sampling face end 105a which is surrounded by the outer clad sampling face end 106a.

Figure 11D:
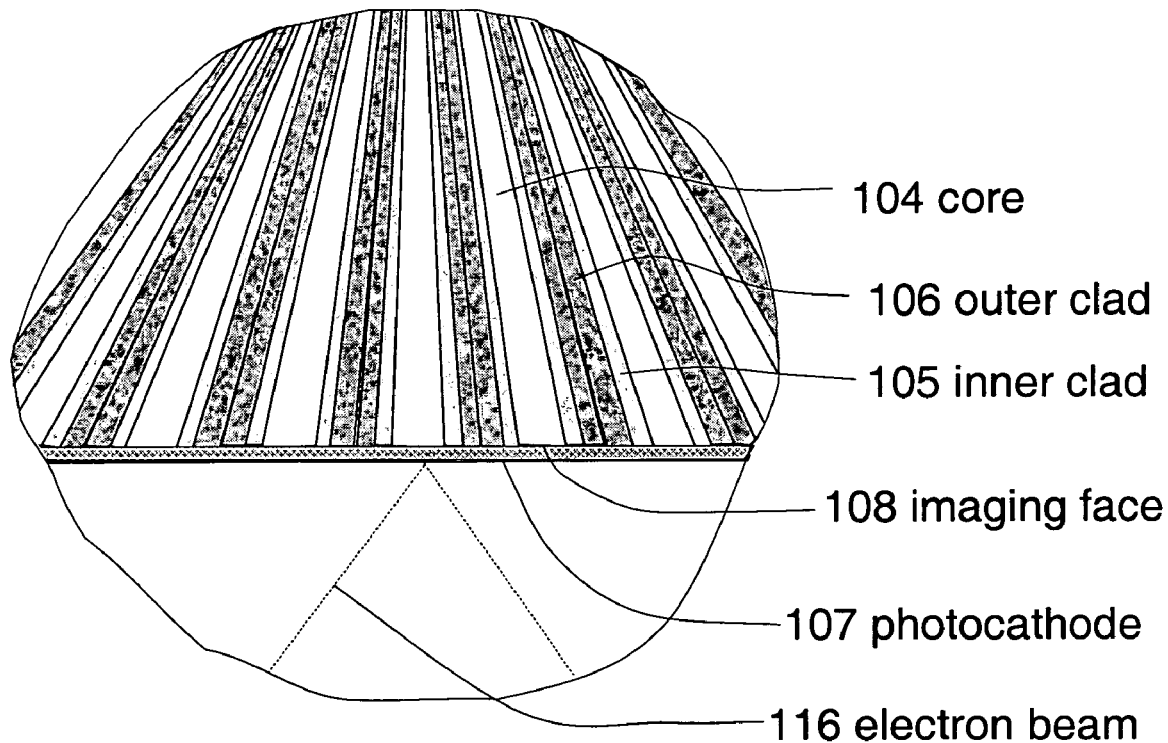
FIG. 11D provides a greatly enlarged fragmentary view of an encircled portion of FIG. 11A of the first embodiment (visible light contact-field optical microscope of present invention)

FIG. 11C provides a perspective view of a double clad single optical fiber portion in isolation (including the optical fiber core 104, inner clad 105 and outer clad 106) from the fiber optical taper 103. FIG. 11D provides a greatly enlarged fragmentary view of an encircled portion of FIG. 11A. The core 104 is surrounded by the inner clad 105 which is surrounded by the outer clad 106. Each optical fiber can guide and convey light within the core 104 of the fiber from one end of the optical fiber to the other because that the core 104 has much higher indices of refraction than that of the inner clad 105. The core 104 of the optical fiber is made of a visible light transmissible high refraction index glass. The inner clad 105 is made of a thin layer low refraction index clear glass which does not absorb light but effectively reflect light and confine the light within the core of the optical fiber. The outer clad 106 is made of a black colored high-density high refraction index glass which can confine and absorb all of the non-image-forming light (from X-ray to infrared) transmitted by the outer clad of each optical fiber.

As shown in FIG. 11C and FIG. 11D, the imaging face 108 contains millions of tiny tapered optical fiber imaging face ends. The imaging face end diameter of each optical fiber is in the range of submicron to micron and the sampling face end diameter of each optical fiber is in the range of nanometer. Each optical fiber imaging face end comprises a core imaging face end 104b, an inner clad imaging face end 105b and an outer clad imaging face end 106b on the surface of imaging face 108.

The techniques used to produce light-absorbing and radiation (such as X-ray) absorbing glass are well known in the glass making industry. One of suitable light-absorbing and radiation absorbing glass contains chromic oxide, gold chloride and lead oxide (or an effective atomic number Z greater than 50).

This invention is not restricted to any particular glass composition since the techniques used to produce light absorbing glass and high or low refraction index glass are numerous and well known in the glass making industry.

In this invention, there are several important advantages of using double clad tapered high contrast optical fiber to confine the imaging light within core of the fiber and block non-image-forming light transmitted by the clad:

1). Tapered Optical Fiber Enhances the Confinement of the Image Forming Light within the Core of the Optical Fiber.

Tapered fibers are governed by one important law, $$d_1 \sin \theta_1 = d_2 \sin \theta_2$$

where diameters and angles are as shown in FIG. 1, $d_1$ is the small core end diameter and $d_2$ is the large core end diameter of the tapered optical fiber. $\theta_1$ is the incident light angle and $\theta_2$ is the light angle after several total internal reflections in the fiber core.

The angle of reflection of a light ray is equal to the angle of incidence; therefore, light entering the small end of a fiber becomes more collimated as the diameter increases because the reflecting surface is not parallel to the fiber axis. After several reflections, all the lights entering the small end of a fiber are parallel to the fiber axis. This parallel effect is helpful to enhance the confinement of the image forming light within the core of the optical fiber.

In a fiber-optical taper the effective numerical aperture ($N.A._{large\ face}$) is determined by the tapering of the fibers. The reduction of $N.A._{large\ face}$ in such fibers is inversely proportional to the magnification. In a cone-shaped fiber the following relations hold for the angles $\alpha$ and $\alpha'$ at the two ends:

$$\sin \alpha' = \sin \alpha / M,$$

$$NA_{large\ face} = N.A._{small\ face} / M,$$

where M is the magnification, $\alpha$ and $\alpha'$ are the obliquity angles at the small and the large ends, respectively. The effective numerical aperture of tapered optical fiber decreases as the diameter of tapered optical fiber increases. The decrease of the effective numerical aperture of a tapered optical fiber means the decrease of the cone angle of the emitted light in the optical fiber and increase the confinement of the image forming light within the core of the optical fiber.

Total internal reflection is the phenomenon which involves the reflection of all the incident light off the boundary. Total internal reflection only takes place when both of the following two conditions are met:
a) the light is traveling within the more optically dense medium and approaching the less optically dense medium.
b) the angle of incidence is greater than the so-called critical angle.

According to Snell's Law equation, a generic equation for predicting the critical angle θcrit can be derived. The derivation is shown below.

$$n_i * \sine(\theta i) = n_r * \sine\ (\theta r)$$

$$n_i * \sine(\theta crit) = n_r * \sine\ (90\ degrees)$$

$$n_i * \sine(\theta crit) = n_r$$

$$\sine(\theta crit) = n_r / n_i$$

$$\theta crit = \sine^{-1}(n_r/n_i) = invsine\ (n_r/n_i)$$

where $n_i$ is incident medium refractive index; $n_r$ is refractive medium refractive index; θi is incident angle; θr is refractive angle; θcrit is critical angle.

The critical angle θcrit can be calculated by taking the inverse-sine of the ratio of the indices of refraction. The ratio of $n_r/n_i$ is a value less than 1.0. This equation for the critical angle can be used to predict the critical angle for any boundary, provided that the indices of refraction of the two materials on each side of the boundary are known.

Tapered optical fiber obviously increases the incident light angle over the critical angle of total internal reflection. As shown in FIG. 11E, if the critical angle of total internal reflection in a optical fiber is angle B (nontapered optical fiber with uniform diameter), the incident light angle C for the tapered optical fiber increases to angle A+angle B (angle C=angle A+angle B, therefore angle C>angle B). The increase of the incident light angle over the critical angle of total internal reflection will enhance the total internal reflection of incident light and increase the confinement of the image forming light within the core of the optical fiber.

2). High Refraction Index Contrast Between Core and Inner Clad

In present invention, there are several advantages that enhance the confinement of the image forming light within the core of the optical fiber.

One of the important criteria to confine the image light within the core of the optical fiber is that the inner clad areas have a smaller index of refraction than the core areas in order for total internal reflection to take place within the core areas. As shown in FIGS. 11C and 11D, the inner clad 105 is a thin layer low refraction index non-absorptive glass which does not absorb light but effectively reflect light and confine the light within the core 104 of the optical fiber. The inner clad 105 is interposed between the fiber core 104 and light absorptive outer clad 106. Confinement of light within the core of each optical fiber of the taper is accomplished by appropriately selecting the characteristics of the core 104 and inner clad 105 of the optical fibers. The confinement of light intensity inside the core 104 of the optical fiber strongly depends on N.A. of the optical fiber. In particular, larger values of NA result in stronger confinement, so the optimum optical fiber has a NA-value as large as possible.

It is given, for a fiber of uniform diameter, by:

$$N.A._{core} = N_0\ \sin\alpha = \sqrt{N_1^2 - N_2^2}$$

$$\sin\alpha = \sqrt{N_1^2 - N_2^2}\ /\ N_0$$

where $N_0$ is the refractive index of the external medium (for air, $N_0$=1, water $N_0$=1.33, glasses $N_0$=1.5–2.8, for contact-field model, $N_0$=sample refractive index); $N_1$ is the refractive index of the core; and $N_2$ is the refractive index of the inner clad. The angle α is the half-angle of the cone of light captured or emitted by the fiber. Most of the imaging related light is confined within the core of the optical fiber by high refraction index contrast between core and inner cladding. Still a small amount of rays incident on the face at greater than angle α will strike the fiber wall at angles less than critical angle. Such rays will not be totally internally reflected and will leak out of the fiber core and enter into inner and outer clad and will be confined within the outer clad by total internally reflection between inner and outer clad and eventually be absorbed by outer clad.

As shown in FIG. 11F the incident light ray strike the fiber wall at angle A less than critical angle and leak out of the fiber core 104 and enter into inner clad 105 and outer clad 106 and is confined within the outer clad 106 by total internally reflection between inner and outer clad and eventually be absorbed by outer clad 106.

3). High Refraction Index Contrast Between Inner Clad and Outer Clad

The criterion which influences the image contrast is the non-image forming light in the cladding. Loss in contrast transfer through the taper is primarily due to the percentage of non-image-forming light transmitted by the cladding of the taper. The cladding material occupies about 25–30% of the commonly high resolution taper's face area. This large amount of non-imaging (scattered) light limits the ratio of contrast transferred through the taper. In present invention, the inner clad material of each optical fiber occupies about 10% of each optical fiber total cross section area and the outer clad material of each optical fiber occupies about 20% of each optical fiber total cross section area.

Further increase in contrast can be achieved by a method called end blocking in which the clad portion at the large face is removed and replaced by a black material.

In present invention, the outer clad area is made of a light blocking high refraction index glass, then the additional benefit of improvements of image contrast can be obtained.

FIG. 11D provides a greatly enlarged fragmentary view of an encircled portion of FIG. 11A. FIG. 11C provides a perspective view of a double clad single optical fiber portion in isolation from the fiber optical taper 103. The inner clad 105 is made of a thin layer low refraction index clear glass which does not absorb light but effectively reflect light and confine the light within the core of the optical fiber. The outer clad 106 is made of a black colored high-density high refraction index glass which can absorb all of the non-image-forming light (from X-ray to infrared) transmitted by the cladding of the taper.

As shown in FIG. 11F the incident light ray strike the fiber wall at angle A less than critical angle and leak out of the fiber core 104 and enter into inner clad 105 and outer clad 106 and is confined within the outer clad 106 by total internally reflection between inner and outer clad and eventually be absorbed by outer clad 106, because the contrast of the refraction index between the outer and inner clad is high enough that light at all incident angles are transmitted through outer clad without any leaks except for small losses due to Fresnel reflection at sampling face and imaging face of the optical taper.

$$\sin \alpha = \sqrt{N_3^2 - N_2^2} \Big/ N_0 > 1$$

where $N_0$ is the refractive index of the external medium (for contact-field model, $N_0$=sample refractive index); $N_3$ is the refractive index of the outer clad and $N_2$ is the refractive index of the inner clad. The angle $\alpha$, the half angle of the acceptance cone, equals 90° and the outer clad 106 totally internally reflects all light entering from any direction.

4). High Light Absorption of the Outer Clad

In present invention, as shown in FIG. 11D, the outer clad 106 is made of black colored high-density high refraction index glass which can confine and absorb all of the non-image-forming light (from X-ray to infrared) transmitted by the cladding of the taper.

As shown in FIG. 13B, the scintillating molecule emitting visible light ray B strike the fiber wall at angles less than critical angle and leak out of the fiber core doped with terbium 304 and enter into inner clad 105 and outer clad 106 and is confined within the outer clad 106 by total internally reflection between inner and outer clad and eventually be absorbed by outer clad 106, because the contrast of the refraction index between the outer and inner clad is high enough that light at all incident angles are transmitted through outer clad without any leaks except for small losses due to Fresnel reflection at sampling face and imaging face of the optical taper.

$$\sin \alpha = \sqrt{N_3^2 - N_2^2} \Big/ N_0 > 1$$

where $N_0$ is the refractive index of the external medium (for contact-field model, $N_0$=sample refractive index); $N_3$ is the refractive index of the outer clad and $N_2$ is the refractive index of the inner clad. The angle $\alpha$, the half angle of the acceptance cone, equals 90° and the outer clad 106 totally internally reflects and absorbs all light entering from any direction.

5). Optimization of the High Energy Radiation Absorption and Conversion in the Core of Scintillating Optical Fiber by Selection of the Length of Scintillating Optical Fiber.

The length of scintillating optical fiber of scintillating fiber optical taper is a function of the energy of the radiation to be converted. Since all the radiation is channeled down the fibers, the length can be made whatever is necessary to achieve efficient absorption and conversion. This advantage can not only increase the efficiency of the high energy radiation absorption and conversion in the core of scintillating optic fiber, but also prevent the high energy radiation such as X-ray to irradiate directly on photocathode, micro-channel plate or phosphor screen and avoid the instrument damage and X-ray leak.

6). Tapered Scintillating Optic Fiber can Re-Directing that Portion of the Light which Propagates Back Toward the Input Face The core of each of tapered scintillating glass fibers is doped with a scintillating material such as terbium to emit visible light when exposed to x-rays, UV light or ionizing particles. With scintillating cores, each fiber becomes an individual transducer. Incident high energy-rays are absorbed and re-emitted isotropically as visible light. A big fraction of this light (approximately 90%) propagates isotropically. Such as visible light ray A in FIG. 13B propagates along the fiber in direction towards imaging face 108 by way of several total internal reflections. The isotropically re-emitted lights by scintillating material stimulated by high energy ray are re-directed to the imaging face of the optical taper by total internal reflection of tapered scintillating glass fiber. This has the effect of re-directing that portion of the isotropically re-emitted light which propagates back toward the input face.

In present invention, the following advantages of using fiber optical taper instead of ordinary optical lens as sample magnifier are described:

1) No Focusing Adjustment is Needed

Light which is emitted, reflected or transmitted by the sample 101 is launched into the sampling face 102 of the fiber optical taper 103, and is conveyed through each optical fiber core 104 to the imaging face 108 of fiber optical taper 103, thereby presenting an enlarged high resolution image at the imaging face 108 of fiber optical taper 103. No focusing adjustment is needed. This advantage makes the present microscope easy to operate.

2) Sample Image is Coupled into the Vacuum Chamber Through Fiber Optical Taper

In present invention, the sample 101 can be easily and continually monitored, manipulated and magnified at normal atmosphere pressure, temperature and normal sample environment (such as in electrolyte solution) and can be coupled into the vacuum chamber 117 through fiber optical taper 103 with zero working distance.

The pre-amplified sample image in the vacuum chamber 117 on the imaging face 108 of the optical taper 103 is converted into a photo-electron image by photocathode 107 on the surface of the imaging face 108 of the optical taper. The photoelectron image is further enlarged by magnetic lenses 114a and 114b like ordinary electron microscope and intensified by micro-channel plate 112. This invention combines the advantages of fiber optical taper and electron microscope together to obtain an undamaged sample dynamic image in gentle sample environment with high spatial and time resolution.

3) No Seidel Aberrations of Lenses

Fiber-optical tapers do not exhibit any of the so-called Seidel aberrations of lenses, such as spherical aberration, chromatic aberration, coma, or astigmatism. When properly made, they exhibit no significant distortion.

The contact imaging method does not use any far-field enlarging optical system and hence does not cause any aberration and the image of the specimen is blurred scarcely because the specimen enlarged image is directly in contact with the photocathode.

4) Zero Work Distance, No Medium Interference

The sample 101 to be viewed is placed directly in contact with the surface of the sampling face 102 of the fiber optical taper 103. The working distance between the sample 101 and the sampling face 102 of the fiber optical taper 103 equals to zero, therefore the present invention can avoid the interference of the medium between the sample and the image detector. This is especially important for the microscope working at infrared radiation because by the fact that water and bodily fluids are opaque to infrared light.

As shown in FIG. 11A, because the sample 101 is placed directly in contact with the surface of the sampling face 102 of the fiber optical taper 103, only the sample image light can enter the sampling face 102. All light sources must go through the sample 101 then can reach the surface of the sampling face 102 and enter into the optical fiber of the taper. The present invention can avoid non-imaging surrounding light interference.

5) Fiber Optical Taper Acts as Pre-Magnifier

In principle, the contact imaging method is able to form an image of very high resolution. The resolution achievable by the contact imaging method is dependent on the resolution of photocathode. The contact imaging method is able to form images of a very high resolution if the photocathode resolution is high enough. In present invention, the sample image is first pre-magnified by fiber optical taper then converted to electron image by photocathode. The pre-magnified sample image can easily match the resolution of photocathode and micro-channel plate techniques. The whole microscope spatial resolution is only restricted by each optical fiber diameter at the sampling face of the fiber optical taper.

6). Contact-Field for Evanescent Wave Detection

The importance of evanescent electromagnetic waves was ignored for a long time in optical and surface physics until the emergence of scanning near-field optical microscopes. The nanometer-sized optical fiber converts some of the evanescent wave into a propagating wave and guides it to detector. Since the evanescent field on the sample surface is scattered and collected by the probe, this mode of operation is called the collection mode.

Because an evanescent field is nonradiative, it cannot be detected in the far-field region. An evanescent wave occurring on the sample surface when light is reflected totally at the inside of sample is picked up by dielectric probe. Taking the optical waveguide probe close to near the sample surface, an evanescent wave is scattered at the probe tip. The scattered light is collected and detected by the photodetector.

Many of the key events in the cell occur in close proximity to membrane surfaces or at the surface of the cell. Any optical technique that can visualize these events without interference from the underlying regions within the cell or cellular structure will increase the amount and quality of information collected.

Evanescent light shows strong distance dependency, and decreases in the form of an exponential function with an increase in distance from the sample surface. In present invention, the sample 101 is placed directly in contact with the surface of the sampling face 102 of the fiber optical taper 103. The distance between evanescent wave on the surface of the sample 101 and the fiber optical taper sampling face 102 equals to zero. Therefore the contact-field optical microscope has no distance dependency decrease of the evanescent light.

7) Contact-Field Enhances Numerical Aperture of the Fiber Optical Taper

The resolution of a microscope objective is defined as the smallest distance between two points on a specimen that can still be distinguished as two separate entities.

The angle $\mu$ is one-half the angular aperture (NA) and is related to the numerical aperture through the following equation:

$$\text{Numerical Aperture }(NA) = n(\sin \mu)$$

where n is the refractive index of the imaging medium between the front lens of the objective and the specimen cover glass, a value that ranges from 1.00 for air to 1.51 for specialized immersion oils. From this equation it is obvious that when the imaging medium is air (with a refractive index, n=1.0), then the numerical aperture is dependent only upon the angle $\mu$ whose maximum value is 90°. The sin of the angle $\mu$, therefore, has a maximum value of 1.0 (sin 90°=1), which is the theoretical maximum numerical aperture of a lens operating with air as the imaging medium (using "dry" microscope objectives).

The refractive index of the imaging medium is critical in determining the working numerical aperture of a microscope objective. A dramatic increase in numerical aperture is observed when the objective is designed to operate with an immersion medium such as oil, glycerin, or water between the front lens and the specimen cover glass. By using an immersion medium with a refractive index similar to that of the glass cover slip, image degradation due to thickness variations of the cover glass are practically eliminated whereby rays of wide obliquity no longer undergo refraction and are more readily grasped by the objective. Typical immersion oils have a refractive index of 1.51 and a dispersion similar to that of glass cover slips. Light rays passing through the specimen encounter a homogeneous medium between the coverslip and immersion oil and are not refracted as they enter the lens, but only as they leave its upper surface.

In this invention, the sample 101 is placed directly in contact with the surface of the sampling face 102 of the fiber optical taper 103. There is no imaging or immersion medium between sample surface and the fiber optical taper sampling face 102. The numerical aperture of the fiber optical taper is enhanced.

8). Black Colored Opaque Glass Embedment of the Fiber Optical Taper

As shown in FIG. 11B, the side 111 of the optical taper 103 is embedded in a light and radiation (such as X-ray) absorbing dark colored opaque glass 110 to prevent background light and radiation interference. The sampling face 102 is in the middle of the sample holder 109 which is formed by black colored heavy density radiation absorbing opaque glass 110 surrounding the sampling face 102. The surface of the sampling face 102 and the surface of the sample holder 109 are at the same plane and there is no opaque glass on the surface of the sampling face 102. Sampling face is the only entrance window of light and high energy radiation. This advantage can prevent the non-imaging light interference from the surrounding.

9). Zero Working Distance Coupling by Direct Deposition of Photocathode on Imaging Face of Fiber Optical Taper Direct deposition of photocathode 107 on imaging face 108 of the fiber optical taper 103 can not only realize the zero working distance coupling between sample image and photocathode 107, but also promote the spatial resolution and contrast of the sample image.

Figure 12B:
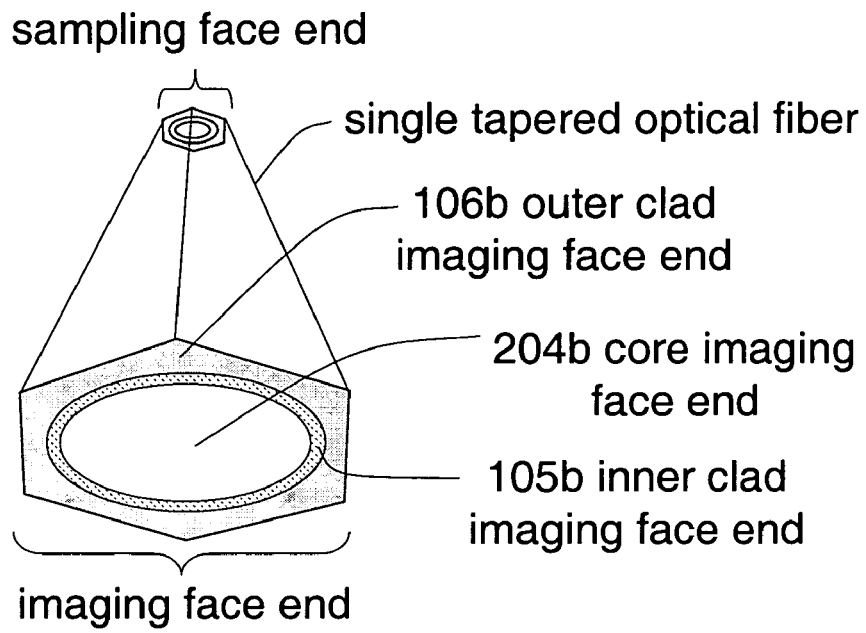
FIG. 12B provides a perspective view of a double clad tapered single optical fiber portion in isolation (including the optical fiber core, inner clad and outer clad) from the fiber optical taper of the second embodiment FIG. 12A (infrared light contact-field optical microscope of present invention)
Figure 12C:
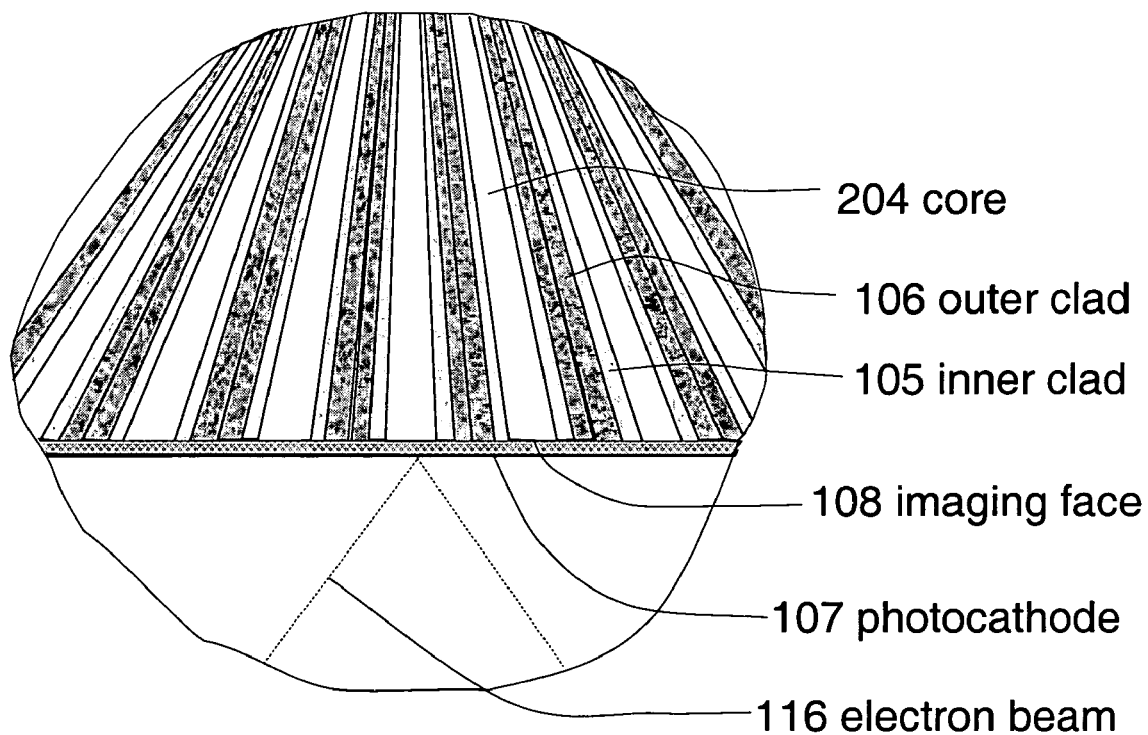
FIG. 12C provides a greatly enlarged fragmentary view of an encircled portion of FIG. 12A of the second embodiment (infrared light contact-field optical microscope of present invention)

Infrared Contact Field Optical Microscope (FIGS. 12A, 12B, 12C)

As shown in FIG. 12A, FIG. 12B and FIG. 12C, the main structure and operation of the infrared contact-field optical microscope are the same like visible light contact-field optical microscope. The only difference is the component of the optical fiber core. The optical fiber core 104 of the optical taper of the visible light contact-field optical microscope is made of a visible light transmissible high refraction index glass, whereas the optical fiber core 204 of the optical taper of the infrared contact-field optical microscope is made of infrared light transmissible high refraction index glass such as chalcogenide glass.

X-Ray, UV, Neutron and Charged Particle Contact-Field Optical Microscope (FIGS. 13A, 13B)

As shown in FIG. 13A and FIG. 13B, the main structure and operation of the X-ray, UV, neutron and charged particle contact-field optical microscope are the same like visible light contact-field optical microscope. The only difference is the component of the optical fiber core. The optical fiber core 104 of the optical taper of the visible light contact-field optical microscope is made of a visible light transmissible high refraction index glass, whereas the optical fiber core 304 of the optical taper of the X-ray, UV, neutron and charged particle contact-field optical microscope is made of high refraction index scintillating glass such as terbium-activated or gadolinium-activated luminescent glass.

One of the fundamental advantages of using the scintillating fiber optical taper is that the length of the scintillating fiber optical taper can be selected to optimize absorption and converting a higher portion of the photon flux than the more x-ray transparent thin polycrystalline phosphor screens without degrading the image due to geometric line spreading.

With scintillating cores, each fiber becomes an individual transducer. Incident high energy-rays are absorbed and re-emitted isotropically as visible light (approximately 550 nm). A big fraction of this light (approximately 90%) propagates isotropically. Such as visible light ray A in FIG. 13B propagates along the fiber in direction towards imaging face 108 by way of several total internal reflections. This has the effect of re-directing that portion of the light which propagates back toward the input face. The balance of the light (such as visible light ray B in FIG. 13B) is absorbed by outer clad 106 which blocks fiber-to-fiber cross-talk. Visible light ray A, the portion of the light emitted at an angle greater than the optical critical angle for the fiber is reflected and guided within the tapered glass fiber and re-directed towards the imaging face 108. Visible light ray B, the portion of the light emitted at an angle less than the optical critical angle of the fiber exits the side of the glass fiber and is absorbed by outer clad 106.

Thus, while various embodiments of the present invention have been illustrated and described, it will be appreciated to those skilled in the art that many changes and modifications may be made thereunto without departing from the spirit and scope of the invention.

What is claimed is:

1. A contact-field optical microscope with nanometer resolution and wide spectrum comprising:

A) a truncated cone shaped fiber optical taper comprising a small diameter sampling face in contact with a sample to be observed, a big diameter imaging face being inside a vacuum chamber and a taper side surrounded by opaque radiation absorbing glass to form a sample carrier surface surrounding the sampling face of the optical taper;

the fiber optical taper further comprising an aligned bundle of a large number of optically transmissive tapered optical fibers disposed coaxially along their lengths, fused together to form a coherent fiber tapered bundle, the diameter of each optical fiber increasing uniformly from the small diameter sampling face to the big diameter imaging face of the optical taper;

each optical fiber comprising a core, an inner clad surrounding the core and an outer clad surrounding the inner clad;

each optical fiber further comprising a sampling face end and an imaging face end;

each optical fiber sampling face end comprising a core sampling face end, inner clad sampling face end and outer clad sampling face end;

each optical fiber imaging face end comprising a core imaging face end, inner clad imaging face end and outer clad imaging face end;

the sampling face of the optical taper comprising a large number of optical fiber sampling face ends fused together;

the imaging face of the optical taper comprising a large number of optical fiber imaging face ends fused together;

the core of each optical fiber comprising a light optically transmissive glass;

the inner cladding of each optical fiber comprising a thin layer of low-density light nonabsorptive clear glass;

outer cladding of each optical fiber comprising a thicker layer of high-density light absorptive opaque glass;

the core of each optical fiber having an index of refraction $N_1$, the inner clad of each optical fiber having an index of refraction $N_2$ and the outer clad of each optical fiber having an index of refraction $N_3$, the sample to be observed having an index of refraction $N_0$;

the optical fiber core having a numerical aperture $N.A._{core}$, the outer clad having a numerical aperture $N.A._{outer\,clad}$;

the index of refraction of the fiber core and inner clad being selected such that the numerical aperture of each optical fiber core being closer to or equal to one, thereby providing a maximum acceptance half-angle of closer to 90 degree and providing 90% image light total internal reflection within the core, where:

$$N.A._{core} = N_0 \sin \alpha = \sqrt{N_1^2 - N_2^2}$$

the index of refraction of the fiber outer clad and inner clad being selected such that the numerical aperture of each optical fiber outer clad being greater than or equal to one, thereby providing a maximum acceptance half-angle of equal to 90 degree and providing 100% non-image light including oblique off-axis rays total internal reflection and absorption within the outer clad, where:

$$N.A._{outer\ clad} = N_0 \sin\alpha = \sqrt{N_3^2 - N_2^2}$$

B) a photocathode deposited on the surface of the imaging face of the fiber optical taper, wherein the photocathode being configured to produce electrons when irradiated with sample image light conducted by the fiber optical taper from sampling face to the imaging face so that a sample electron image is formed by photocathode;

C) a vacuum chamber formed by chamber wall, photocathode which is deposited on the surface of imaging face and phosphor screen which is deposited on the inner surface of a faceplate;

D) magnetic lenses configured to enlarge and focus an electron beam of electrons emitted by the photocathode;

E) a micro-channel plate configured to enhance the sample electron image;

F) a phosphor screen deposited on the inner surface of a faceplate, configured to convert the sample electron image to visible image;

G) a faceplate configured to conduct the visible image on the phosphor screen to a CCD device outside of the vacuum chamber; and H) a CCD device configured to couple the sample image to monitor, camera or computer.

2. The contact-field optical microscope as claimed in claim 1 wherein the said sampling face is in contact with a sample to be observed so that the working distance between sampling face of the optical taper and the sample is zero, there is no medium between sampling face of the optical taper and the sample and the sample image is formed on the sampling face of the optical taper without medium interference.

3. The contact-field optical microscope as claimed in claim 1 wherein the said sampling face is in contact with the sample to be observed so that the working distance between sampling face of the optical taper and the sample is zero and the sample image is formed on the sampling face of the optical taper without Seidel aberration.

4. The contact-field optical microscope as claimed in claim 1 wherein the said sampling face is in contact with the sample to be observed so that the working distance between sampling face of the optical taper and the sample is zero and the sample image is formed on the sampling face of the optical taper without focusing.

5. The contact-field optical microscope as claimed in claim 1 wherein the said index of refraction of the fiber core and inner clad being selected such that the numerical aperture $N.A._{core}$ of each optical fiber core being closer to or equal to one, thereby providing a maximum acceptance half-angle of closer to 90 degree and providing 90% image light total internal reflection within the core, where:

$$N.A._{core} = N_0 \sin\alpha = \sqrt{N_1^2 - N_2^2}.$$

6. The contact-field optical microscope as claimed in claim 1 wherein the said index of refraction of the fiber outer clad and inner clad being selected such that the numerical aperture $N.A._{outer\ clad}$ of each optical fiber outer clad being greater than or equal to one, thereby providing a maximum acceptance half-angle of equal to 90 degree and providing 100% non-image light including oblique off-axis rays total internal reflection and absorption within the outer clad, where:

$$N.A._{outer\ clad} = N_0 \sin\alpha = \sqrt{N_3^2 - N_2^2}.$$

7. The contact-field optical microscope as claimed in claim 1 wherein the said optical fiber outer clad of each optical fiber comprises a high-density light absorptive, high refraction index opaque glass so that all of the non-image-forming lights (from X-ray to infrared) transmitted by the cladding of the taper are confined and absorbed within the outer clad of each optical fiber.

8. The contact-field optical microscope as claimed in claim 1 wherein the said inner clad of each optical fiber comprises a low-density light nonabsorptive clear glass so that there is no light absorption on the interface between the core and inner clad of each optical fiber.

9. The contact-field optical microscope as claimed in claim 1 wherein the said optical fiber core comprises infrared glass such as chalcogenide glass so that the infrared contact-field optical microscope is constructed.

10. The contact-field optical microscope as claimed in claim 1 wherein the said optical fiber core comprises scintillating glass to form a scintillating optical fiber so that the UV, X-ray and charged particle contact-field optical microscope is constructed.

11. The scintillating optical fiber as claimed in claim 10 wherein each optical fiber is tapered so that the isotropically re-emitted lights by scintillating material stimulated by high energy ray are re-directed to the imaging face of the optical taper by total internal reflection of the tapered scintillating glass fiber.

12. The scintillating optical fiber as claimed in claim 10 wherein the length of the scintillating optical fiber is selected to increase the efficiency of high energy radiation absorption and conversion in the core of scintillating optic fiber and to prevent the high energy radiation such as X-ray to irradiate directly on photocathode, micro-channel plate or phosphor screen to avoid the instrument damage and X-ray leak.

13. The contact-field optical microscope as claimed in claim 1 wherein the said optical taper side is surrounded by opaque radiation absorbing glass to form a sample carrier surface surrounding the sampling face of the optical taper so that the sampling face of the optical taper is the only entrance of light outside of the microscope to prevent the non-imaging light interference from the surrounding.

14. The contact-field optical microscope as claimed in claim 1 wherein the said imaging face of the fiber optical taper is inside the vacuum chamber so that a pre-enlarged sample image is coupled into the vacuum chamber by the fiber optical taper.

15. The contact-field optical microscope as claimed in claim 1 wherein the said photocathode is deposited directly on the surface of the imaging face of the fiber optical taper, wherein the photocathode is configured to produce electrons when irradiated with sample image light which is conducted by the fiber optical taper from sampling face to the imaging face so that a sample electron image is formed by photocathode inside the vacuum chamber with zero working distance.

16. The contact-field optical microscope as claimed in claim 1 wherein the said sample image is pre-amplified and coupled into vacuum chamber by fiber optical taper and converted into electron image which is further magnified by the magnetic lenses so that the fiber optical taper image pre-magnifier is combined with magnetic lens magnifier.

17. The contact-field optical microscope as claimed in claim 1 wherein the said sample is placed directly in contact with the surface of the sampling face of the fiber optical taper so that the distance between evanescent wave on the surface of the sample and the fiber optical taper sampling face equals to zero therefore the contact-field optical microscope has no distance dependency decrease of the evanescent light.

* * * * *